United States Patent [19]

Taaffe et al.

[11] Patent Number: 5,046,027

[45] Date of Patent: Sep. 3, 1991

[54] APPARATUS AND METHOD FOR PROCESSING AND DISPLAYING IMAGES IN A DIGITAL PROCESOR BASED SYSTEM

[75] Inventors: James L. Taaffe, Arlington; Maria Kaldis, Boston, both of Mass.

[73] Assignee: Massachusetts General Hospital, Boston, Mass.

[21] Appl. No.: 268,781

[22] Filed: Nov. 8, 1988

[51] Int. Cl.$^5$ .......................................... G06F 15/32
[52] U.S. Cl. .................................... 364/521; 340/723
[58] Field of Search ....................... 364/518, 521, 523; 340/723, 745, 747, 748, 750

[56] References Cited

U.S. PATENT DOCUMENTS

| | | |
|---|---|---|
| 3,346,853 | 10/1967 | Koster et al. . |
| 3,784,737 | 1/1974 | Waehner . |
| 3,872,444 | 3/1975 | Cleveland et al. ............... 340/172.5 |
| 3,909,792 | 9/1975 | Harris et al. ......................... 364/900 |
| 3,961,324 | 6/1976 | Cousin ......................... 340/324 AD |
| 4,070,694 | 1/1978 | Sakamoto et al. ................... 358/133 |
| 4,119,953 | 10/1978 | Yeschick ..................... 340/324 AD |
| 4,122,518 | 10/1978 | Castleman et al. .................. 364/300 |
| 4,145,754 | 3/1979 | Utzerath ............................... 364/900 |
| 4,205,387 | 5/1980 | Ovshinsky et al. .................. 364/900 |
| 4,242,730 | 12/1980 | Golias et al. ......................... 364/416 |
| 4,266,249 | 5/1981 | Chai et al. ............................ 358/260 |
| 4,276,473 | 6/1981 | Kato et al. ......................... 250/327.1 |
| 4,280,138 | 7/1981 | Stock .................................... 358/150 |
| 4,382,286 | 5/1983 | Mitchell et al. ...................... 364/900 |
| 4,449,195 | 5/1984 | Andrews et al. ..................... 364/900 |
| 4,460,923 | 7/1984 | Hirano et al. ........................ 358/136 |
| 4,464,733 | 8/1984 | Misker et al. ........................ 364/900 |
| 4,468,750 | 8/1984 | Charnoff et al. ..................... 364/900 |
| 4,550,386 | 10/1985 | Hirosawa et al. .................... 364/900 |
| 4,559,533 | 12/1985 | Bass et al. ............................ 340/724 |
| 4,601,003 | 7/1986 | Yoneyama et al. .................. 364/518 |
| 4,602,333 | 7/1986 | Komori ................................ 364/414 |
| 4,658,299 | 4/1987 | Tanaka et al. ....................... 358/256 |
| 4,760,388 | 7/1988 | Tatsumi et al. .................. 340/750 X |
| 4,761,642 | 8/1988 | Huntzinger ..................... 340/747 X |

FOREIGN PATENT DOCUMENTS

| | | |
|---|---|---|
| 0051226 | 5/1982 | European Pat. Off. . |
| WO87/05768 | 9/1987 | PCT Int'l Appl. . |
| 2082014 | 2/1982 | United Kingdom . |

OTHER PUBLICATIONS

"Overlay optical-fiber local-area network", by Keller et al., GLOBECOM '85 IEEE Global Telecommunications Conference, New Orleans, LA, Dec. 2-5, 1985, *Conference Record*, vol. 3, pp. 1185-1189.

"Digitale Bildinformationssysteme in der Radiologie— Eine technische Herausforderung", *N.T.Z.-Archiv.*, vol. 8, No. 3, Mar. 1986, pp. 55-59.

*Primary Examiner*—Heather R. Herndon
*Attorney, Agent, or Firm*—Hamilton, Brook, Smith and Reynolds

[57] ABSTRACT

An image processing and display system employs a high speed image LAN (Local Area Network) for transferring image data separate from control data. A general purpose LAN carries graphics data and control data of the system. One more image display controller than display monitor is used to provide off line processing of images prior to display of the images. An analog cross bar switch provides the necessary connections between image display controllers and the display monitors to provide the desired views of selected images. Images are initially provided to the system from an image archive in a compressed manner. The images are decompressed and held in a local cache. With respect to each work of image data, different bytes of the work are compressed by different compression schemes to optimize transfer time of image data. A method is employed for transparently sharing a high performance image archive processor among various workstations of display monitors.

44 Claims, 10 Drawing Sheets

ANALOG CROSS-BAR SWITCH

ANALOG TRANSFER GATE

Fig. 12a — Screen layout database (50)
- Accessed by Layout ID
- text description
- number of partitions this screen
- location of all partitions
- attributes of all partitions
- graphic object locations

Fig. 12b — Image database (60)
- Accessed by Image ID
- physical characteristics of image
- default display attributes
- image owner's demographics

Fig. 12c — Display database (66)
- Accessed by Display ID
- pixel resolution of display
- spatial resolution of display
- bit depth of display
- capabilities of display
- pointer to display support software

Fig. 12d — Screen-partition database (62)
- Accessed by Screen-partition
- pending commands to execute
- high level transformations
- partition attributes
- image ID number
- current image display attributes
- non-commuting transforms
- overlay graphics

APPARATUS AND METHOD FOR PROCESSING AND DISPLAYING IMAGES IN A DIGITAL PROCESOR BASED SYSTEM

BACKGROUND OF THE INVENTION

A typical computer network system includes a digital processor, a main disk for storage and several workstations which are serviced by the digital processor and which share the information stored in the main disk. Each workstation generally includes one or more display and keyboard terminals which enable a user to process and view data retrieved on a selected basis from the main disk. In such workstations the cost of the display hardware and the speed with which images can be loaded from the main storage or an image archive is critical and of prime importance. Nowhere is this more so than in a workstation with many high resolution displays, such as one would find in a medical workstation or other workstation used for diagnostic purposes and in an image processing workstation.

In the transmission of image data from an image archive or an image processor to a display workstation, the speed at which the image is transmitted is of paramount importance. There are generally two solutions that can be addressed to decrease this time. One solution is to increase the bandwidth of the communication channel between the image archive and workstation. A second solution is to compress the data prior to transmission. Data compression, in this context, is only effective if the decompression time is negligible in relation to the time saved to transmit the data. There are two main classes of image compression algorithms, noisy algorithms and exact algorithms. Noisy algorithms are those that produce a small difference between the original image and one that has undergone a compression-decompression cycle. Exact algorithms, are those that leave the image completely unchanged upon being decompressed.

Various arrangements of display hardware and use of various compression schemes have been used to provide optimum image display systems within a computer network assembly but none are problem free, simple or inexpensive.

SUMMARY OF THE INVENTION

The present invention provides a digital image processing and display system which optimizes the time and cost efficiencies of display hardware and data transmission. One feature of the system is that separate communication channels are provided to workstations of the display system from a digital processor and image archive for control data and image data. In the preferred embodiment, the image archive and digital processor are tightly coupled forming an image archive/processor unit. A one way optical LAN (Local Area Network) carries image data from the image archive/processor unit to a workstation of the display system while a general purpose LAN carries control data, image address data and user supplied graphics data from the unit to a workstation. Within the workstation, a high-speed-image bus is used to carry image data alone while a general-purpose-control bus is employed to carry control and graphics data.

In addition, the digital image processing and display system includes a display controller scheme in which a group of display monitors is driven in a paint-free fashion, that is by an abrupt, whole image changeover as opposed to a line by line changeover of images, such that instantaneous changeover from one image to a new image is provided upon the display monitors. In the display controller scheme, there is at least one more controller than monitor, and each controller is connected to a different monitor to drive the monitor. Each controller is also able to be loaded with a different image to display that image on the respective monitor.

In the preferred embodiment, a cross-bar switch is used to connect the controllers with the monitors in a one-to-one correspondence relationship, there being one controller at all times unconnected to any monitor. The unconnected display controller is free to be supplied with image data from the image archive through a local buffer or from another display controller which is connected to a monitor. Once the unconnected display controller is loaded with the desired image data, a currently connected display controller is disconnected from its monitor while the unconnected display controller is connected to the monitor. The unconnecting of the one display controller and connecting of the other display controller holding the desired new image data provides an instantaneous changeover between images, and as a result, a paint-free, steady display of a succession of images on the monitor.

With respect to the aspect of minimizing data transfer time between the image archive/processor unit and the workstations, the present invention adaptively applies different ones of various compression schemes to each part of a data word of an image according to high order and low order bits of the word. That is, different compression schemes are used for the high and low order bits of the same image data word, and the compression schemes of either (or both) the high order or low order bits may change from one sequence of image data words to the next. Such an adaptive application of compression schemes enables those compression schemes which best condense long series of similar bytes and those compression schemes which more advantageously condense short series of similar bytes to do so in the same image. Typically, prior art systems employ only one compression scheme to handle all data words of an image. In the preferred embodiment, a Run Length Coding method is used to compress high order bytes of image words, and various Run Length Coding schemes and two different Delta Coding schemes are used to compress the low order bytes of the image words which tend to change more frequently than the high order bytes.

The foregoing aspects of the display system of the present invention enable "virtual image processing". In such image processing, a network of workstations share the image archive/processor unit without compromising speed of performance. This is accomplished by a processing scheme which does not require image data to be passed between the workstations and image archive/processor unit but only from the image archive/processor unit to the workstations. As a result, the use of the image archive/processor unit by each workstation is transparent to the other users. In a preferred embodiment, any one monitor may temporarily serve as a graphic or iconic control screen showing the placement of images on all other monitors. Furthermore, user interaction with this control screen can effect the movement and selection of both the images being displayed and those to be displayed on the other monitors. The one chosen monitor thus serves as a central control monitor through which the user requests and arranges images to be displayed with respect to the other monitors. For each monitor of the workstation, the user may specify which images and the order in which those images are to be displayed, the order including serial arrangement as well as simultaneous display in different partitions, i.e. rectangular areas, on the monitor. Such a display of the specified images is provided without noticeable delay caused by another user at another workstation of display monitors requesting the same or other images to be displayed.

In a particular medical application of the image processing and display system, radiological images are selected and viewed from the monitors of a workstation. The images may be displayed in various orientations and gray scale transformations on several monitors and/or in different partitions of one monitor as desired for diagnosis or other purposes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1b is a schematic view of the image handling and display portion of one workstation of the network of FIG. 1a.

FIG. 2b is an electrical schematic diagram of a transfer gate employed in the crossbar switch of FIG. 2a.

FIG. 11 is an illustration of image display software used to support the workstations of the network in FIG. 1a.

FIGS. 12a–12d are illustrations of the data structures employed in the software of FIG. 11.

DETAILED DESCRIPTION OF THE INVENTION

Figure 1A:
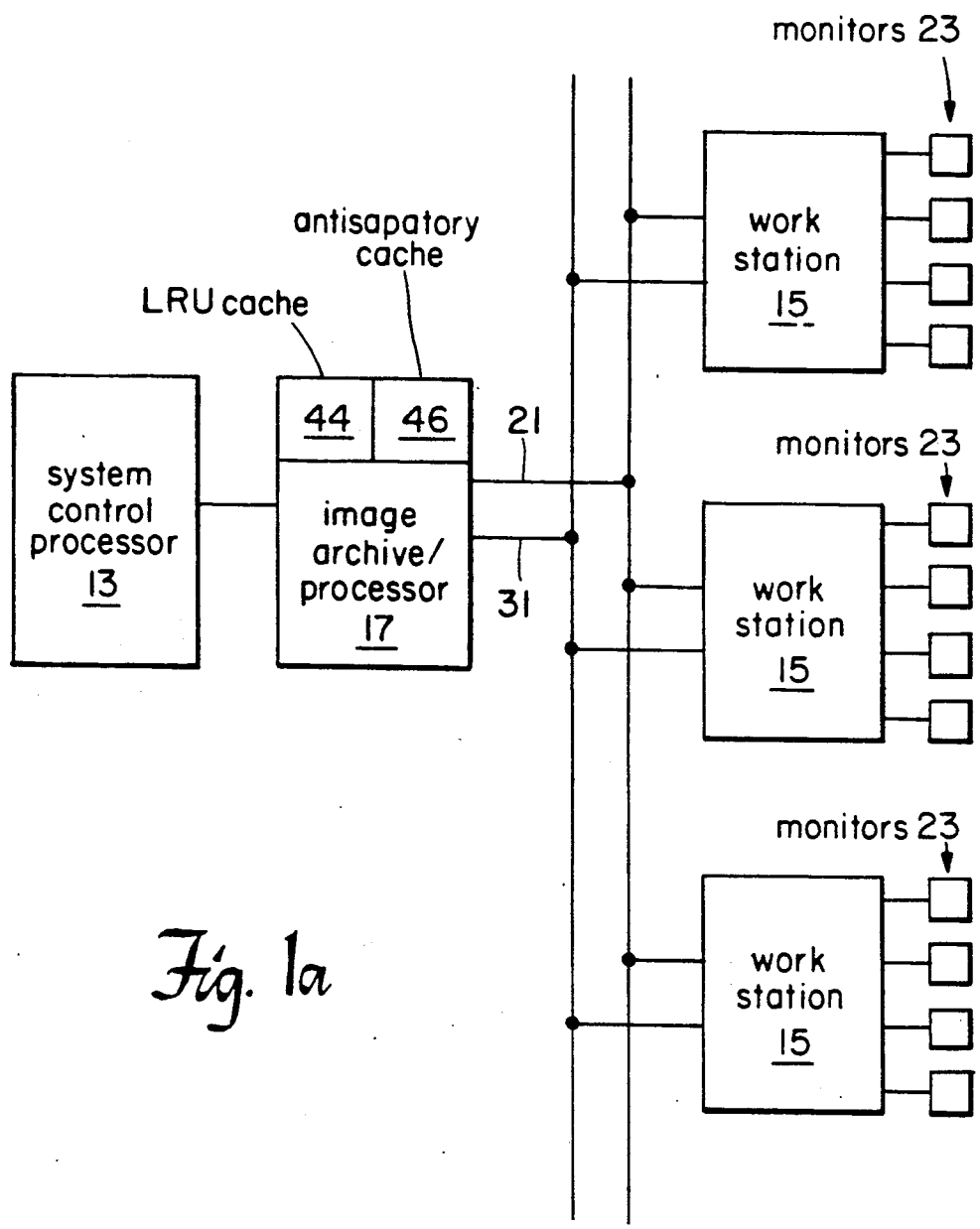
FIG. 1a is a schematic view of a network of workstations connected to a central image archive/processor embodying a display system of the present invention.
Figure 1B:
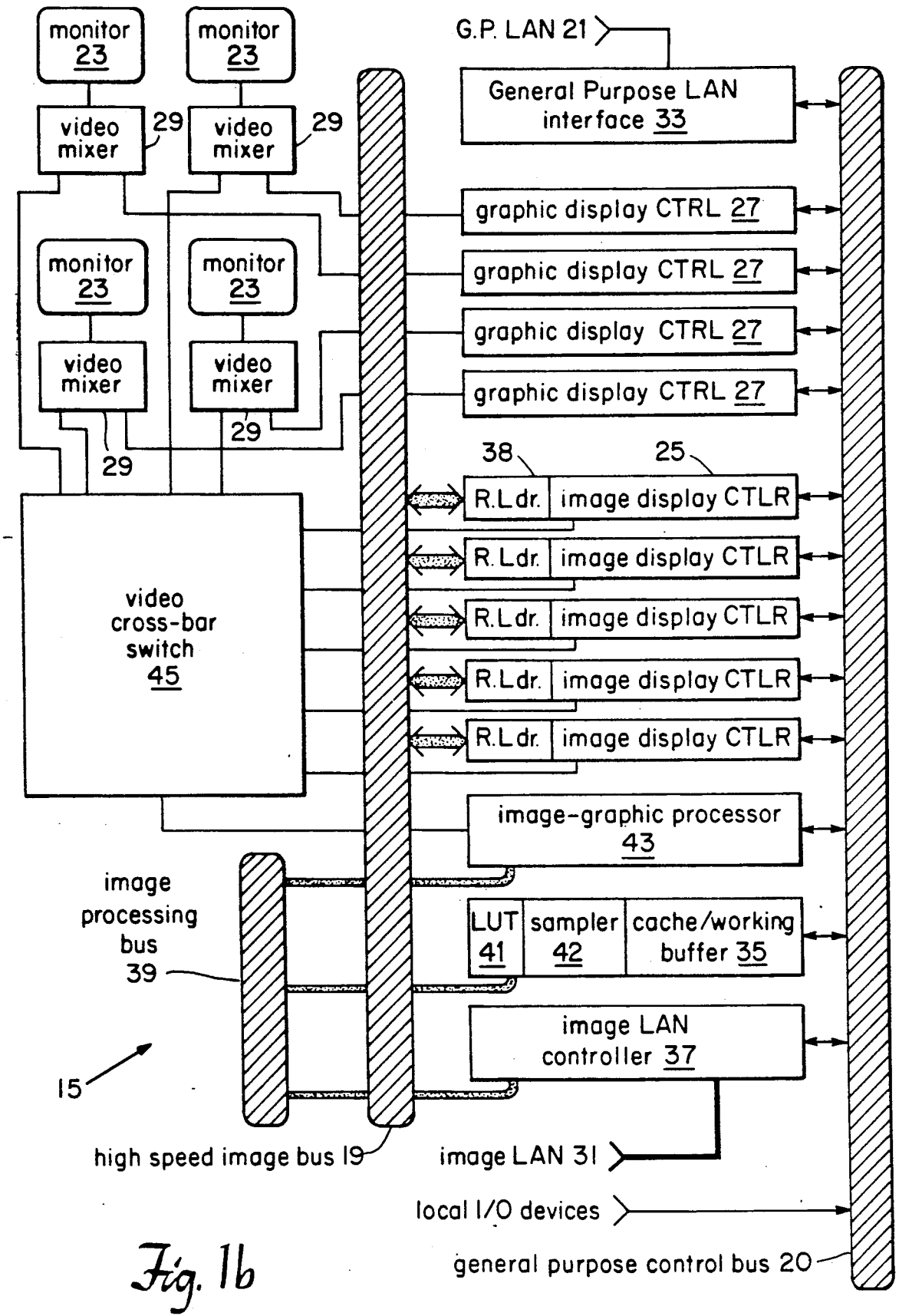

An image/graphics display and processing system embodying the present invention is provided in FIGS. 1a and 1b. Images of interest are previously generated by other means and are stored in an image archive/processor 17, in a compressed or uncompressed form. The system of the present invention provides retrieval of selected images from the archive/processor 17 and processing and display of retrieved images, with or without superimposed graphics, at various workstation terminals 15 in a network of workstations which share both a system control processor 13, referred to as the host computer, and the image archive/processor 17. Further, the system provides a view of desired images over several monitors 23 of a workstation 15 and/or over different user partitions of a single monitor in a user specified manner.

Figure 1C:
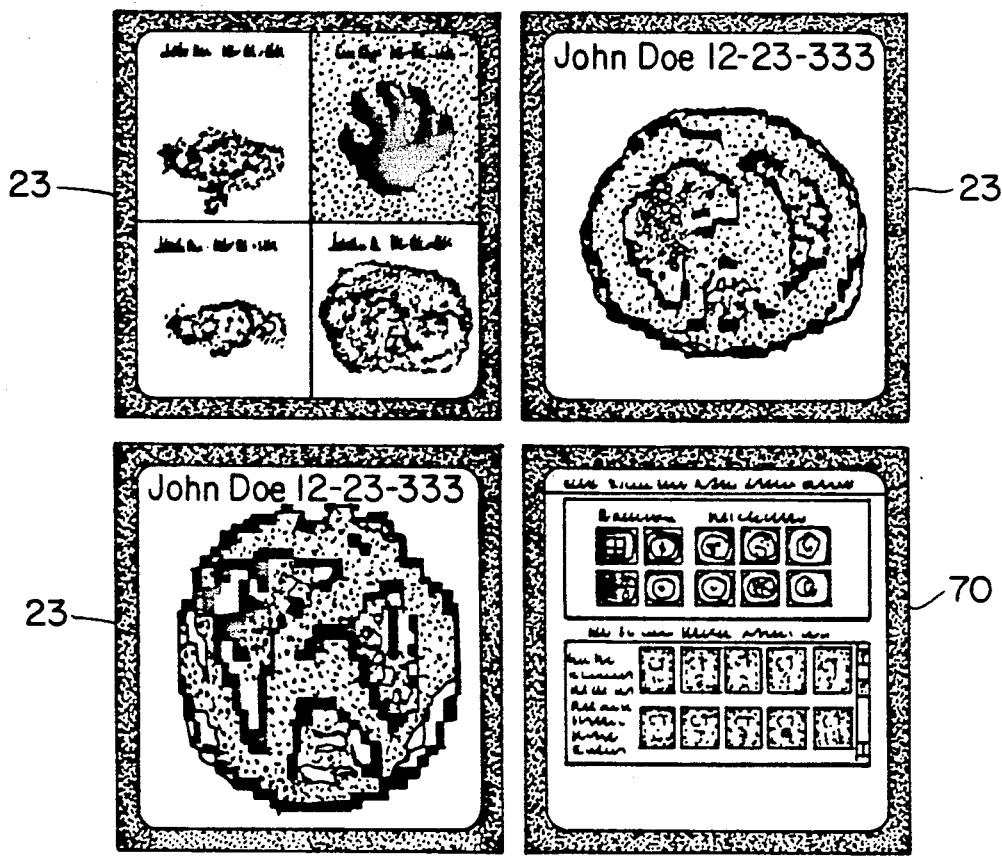
FIG. 1c is an illustration of an image display format supported by the multiple monitors in the workstation of FIG. 1b.
Figure 1D:
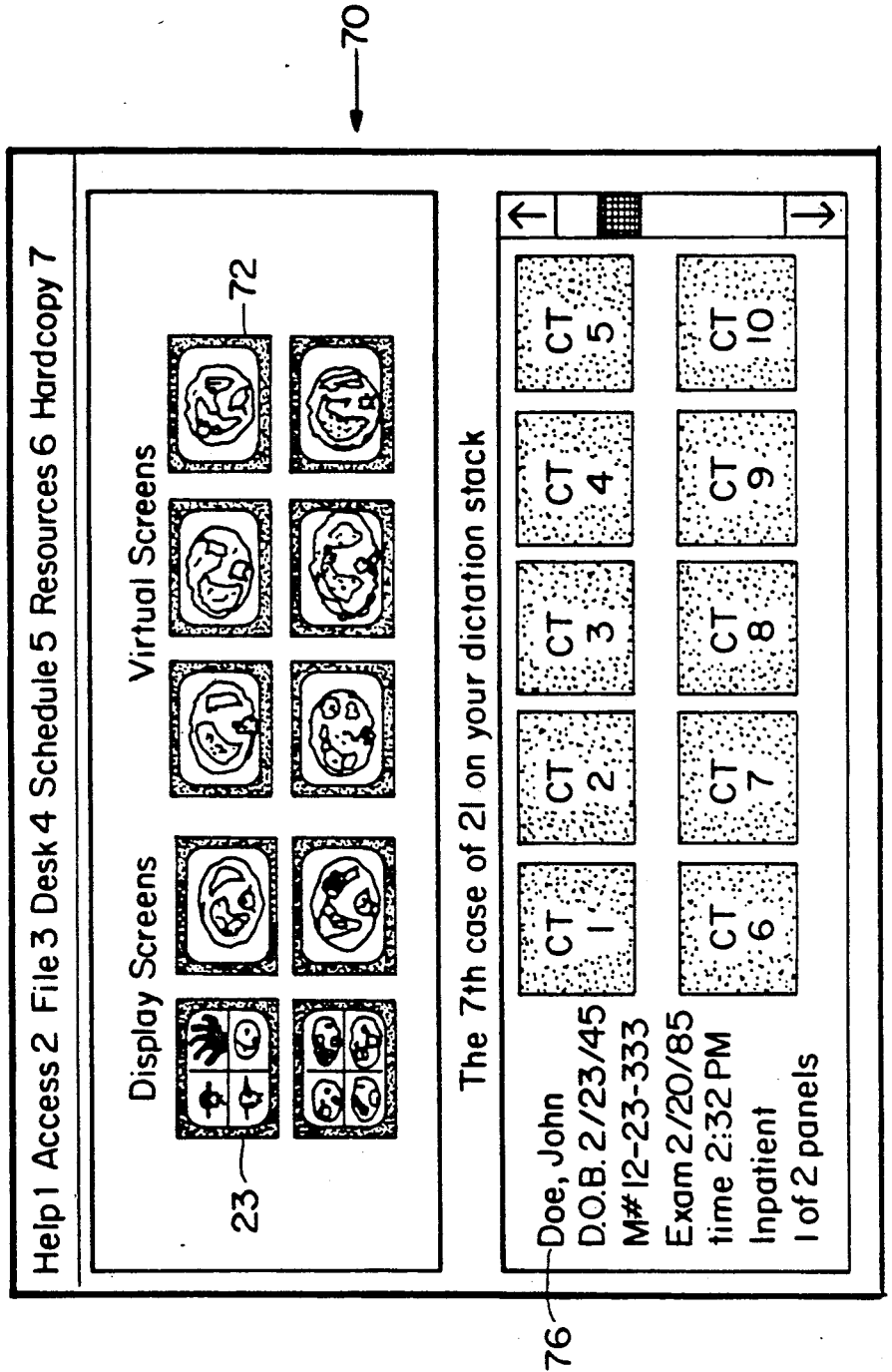
FIG. 1d is a schematic view of one portion of the display format of FIG. 1c supported by a control monitor.

In the preferred embodiment, within each workstation 15, one user selected monitor 70 provides a view of the user selected images being displayed and those to be displayed on each remaining monitor 23 of the workstation 15 as illustrated in FIGS. 1c and 1d. Thus, through this one monitor 70, the user arranges each desired image to be displayed currently or in the future on a specified monitor or partition thereof, at a desired grey level transformation and/or orientation. Graphical and/or iconic indications aid the user in accomplishing his desired ordering of images, such as a miniaturized display or other identification of the next image 72 to be displayed on a monitor 23 and an indication of that relationship between the image 72 and monitor 23. In addition, a single cursor is employed and is moveable from monitor to monitor in a fashion that allows all the monitors to effectively be a single large display screen. Further, the one selected monitor 70 serves as an organizational member of the workstation 15 which enables the user to view desired images on the remaining workstation monitors 23 while, in a provided work area 76, processing another image off line for future viewing. The one monitor 70 may be any of the monitors of the workstation 15 as described later.

With reference FIG. 1a, through a general purpose LAN (Local Area Network) 21 the host computer 13 controls the flow of image data and graphics data to the workstations 15. The image data of selected images requested at by a workstation are passed to the workstation 15 on an optical Local Area Network (LAN) 31 which is a high speed, unidirectional, primarily image carrying channel from the image archive/processor 17 to the workstations 15. Graphics data and text data such as geometric markings (lines, boxes, etc.) provided by the user to be overlaid on image data are transferred on the general purpose LAN 21. Control data and image address data are also passed to the workstations 15 on the general purpose LAN 21.

For greater time efficiency, the image archive/processor 17 preferably employs a cache 44 (FIG. 1a) of the most recently accessed images and an anticipatory cache 46 for holding images determined to be images that are likely to-be-accessed next. These caches 44, 46 operate in a manner common in the art.

In addition, to ensure fair utilization of image archive/processor 17 by many workstations 15, each command asked of image archive/processor 17 has associated with it a priority. This prevents those image processing commands which take inordinate time and resources from blocking or delaying more routine commands generated from other workstations. To implement such priority, a fast queue and a slow queue are employed by the image archive/processor 17.

In each workstation 15 as shown in FIG. 1b, an image only handling module called an image LAN (Local Area Network) controller 37 receives the image data directed to that workstation 15 from the Optical LAN 31. The image LAN controller 37 is coupled to the Optical LAN 31 in a receive only manner, and preferably comprises TAXI chips of Advanced Micro Devices, Inc. or the like for receiving the image data. After receiving the image data, the image LAN controller 37 transfers the image data on a 32 bit wide image processing bus 39, or appropriate bus and places the image data into a cache/working buffer 35. In some cases, the image LAN controller 37 decompresses the image data before placing the image data into the cache/working buffer 35.

The cache/working buffer 35 is a multimegabyte memory whose primary purpose is to locally hold, for the workstation 15, image data representing images retrieved from the image archive/processor 17. Preferably the cache/working buffer 35 is formed of standard dynamic RAM chips with access times of about 100 nanoseconds. The cache/working buffer 35 is dual-ported and is accessed sequentially through either the image processing bus 39 or a suitably wide (e.g. 32 bit wide) high speed image bus 19. More specifically, the image processor bus 39 conveys image data between the cache/working buffer 35 and the image graphic processors, and the high speed image bus 19 transfers image data from cache/working buffer 35 to image display controllers 25 (to be described). Between the cache/working buffer 35 and the high speed image bus 19 are a lookup table 41 and a subsampling subsystem 42. The lookup table 41 performs grey scale transformation by simple substitution through a RAM which is preferably 4K bytes deep. That is, look-up table 41 translates image data from an input scale of pixel values to a desired output scale of pixel values on their way onto the high speed image bus 19. The contents of look up table 41 are modifiable by the image-graphic processor 43.

Subsystem 42 effects the magnification or minification of images to be displayed. The subsystem 42, in the case of magnification, duplicates the image data flowing therethrough and in the case of minification subsamples the image data flowing therethrough. For example, for an image to be magnified by a factor of 2, the subsystem 42 replicates each pixel and replicates each line of the image.

Also within each workstation terminal 15, there is a display sub-system which enables the workstation 15 to display and manipulate images and graphics on a predetermined number of monitors 23 or screens connected to the workstation terminal. An illustration of a single workstation 15 with four display monitors 23 is provided in FIG. 1b although any number of monitors of any type could be used. Preferably, each monitor 23 displays images in black and white and graphics in color. In some cases color images and black and white graphics may be preferred and are similarly provided. This is accomplished through an assembly of video mixers 29, graphic display controllers 27 and image display controllers 25. There is one video mixer 29 and one graphic display controller 27 for each monitor 23, and at least one more image display controller 25 than number of monitors 23. Thus, each monitor 23 is connected to a different video mixer 29 which, combines video graphic signals from one dedicated graphic display controller 27 and video image signals from one changeable image display controller 25, to be described later.

Each graphic display controller 27 is a 768 by 1024 by 4 bit display controller whose primary purpose is to generate a high bandwidth analog video graphic display signal from digital information. The display memory of each graphic display controller 27 supports limited access, simultaneous with display, via a general purpose control bus 20. Also, each graphic display controller 27 contains a triple 4-bit RAMDAC (Random Access Memory with Digital to Analog Converter) and thus, outputs a video RGB (red green blue) signal in the case of color graphics. Other output signals of each graphic display controller 27 are attribute bits for indicating graphic blinking and presence of graphic data. Modification of the graphic display controller 27 memory and creation of graphics through the graphic display controller 27 is performed by the image graphic processor 43 through the general purpose control bus 20.

Each image display controller 25 is a $1536 \times 2048 \times 8$ bit display controller whose primary purpose is to generate a high bandwidth, for example approximately 250 mhz, analog video display signal from a digital pixel map. The display memory on each image display controller 25 does not support simultaneous access but instead can be taken off line (i.e. disconnected from video mixer access) and accessed (i.e. read from or written to) via the high speed image bus 19. Because image data at this stage has already been translated by look-up table 41, each image display controller 25 does not depend on a look-up table of its own unlike display controllers in existing display systems, and each display controller 25 outputs a single standard analog video signal plus synchronization signals. Generally, each image display controller 25 comprises 3 megabytes of RAM (Random Access Memory), a rectangle loader (described later), a display timing generator, a video digital-to-analog converter and a high speed image bus interface.

The high speed image bus 19 provides an image-data-only transfer channel from the cache/working buffer 35 to the image display controllers 25 and between image display controllers 25. In the preferred embodiment, the high speed image bus 19 carries four 8-bit image pixel values per transfer and normally operates in a block-transfer burst mode. On the other hand, the general purpose control bus 20 is used to carry control and status information to all components of the workstation 15 and does not necessarily carry image data.

Having one more image display controller 25 than monitor 23 enables the display subsystem of workstation 15 to provide the user with a more paint-free (i.e. abrupt changeover) looking display from image to image. Further, the easiest and fastest method of loading an image display controller 25 is to do so when the image display controller 25 is not currently supporting a monitor 23 and is totally available for receiving from the high speed image bus 19 a newly retrieved or modified image to be displayed next. A crosspoint or crossbar switch 25 is used to quickly connect the disconnected, available image display controller 25 with any monitor 23 and thus route the video image signals from the available image display controller 25 to any monitor 23. This connecting of any four of the five image display controllers 25 to the monitors 23 is schematically illustrated in FIG. 1b and shown in more detail in FIGS. 2a and 2b.

In a preferred embodiment, the crossbar switch 45 is a configuration of transfer gates 47 positioned at each intersection of the five input rows and four output columns, the rows being input lines (Ein) from the image display controllers 25 and the columns being output lines (Eout) to the monitors 23. Only one transfer gate 47 per column is allowed to be conducting at one time. Each transfer gate 47 performs as a high speed analog switch and conveys high frequency signals with low distortion and minimal noise. Referring to FIG. 2b within each transfer gate 47, a diode 51 is forward biased by an incoming control signal 49 and serves as a low resistance ohmic device which carries the input signal (Ein) unchanged to the output line (Eout). When the diode 51 is reverse biased by the control signal 49, the high impedance of the diode 51 effectively blocks the input signal (Ein). Capacitors C1 and C2 perform DC blocking functions and have values chosen sufficiently large so as to not degrade the low frequency components of the transferred input signal. Resistor pairs R1-R2 and R3-R4 perform impedance matching functions.

An example of the operation of the crossbar switch 45 during the loading of one image onto a full display screen of monitor 23 labelled Monitor$_2$ in FIG. 1b follows. Assume that crossbar switch currently directs image signals from input line Ein 1 supplied by image display controller 25 to Monitor$_2$ through output line Eout 2. The image graphic processor 43 (FIG. 1b) determines which image display controller 25 is the available one. Assuming the available image display controller 25 is the one which supplies input line Ein 3 (FIG. 2a), the image graphic processor 43 transfers the desired image data from the cache/working buffer 35, across the high speed image bus 19 and into the image display controller associated with input line Ein 3. After the controller is fully loaded, the image graphic processor 43 generates a control signal for reverse biasing diode 51 at all transfer gates 47 in the second column (i.e. the Eout 2 line connected to Monitor$_2$) of FIG. 2a except the one located in the row labelled Ein 3. Consequently, the crossbar switch 45 disconnects the initial connection from Ein 1 to Eout 2 (i.e. from image display controller 25 at Ein 1 to Monitor$_2$ at Eout 2) and routes only the video image signal from the image display controller Ein 3 to Monitor$_2$.

It is noted that the foregoing load is accomplished at the highest rate that the cache working buffer 35 can sustain since the available image display controller's complete memory bandwidth is available. Further, from the user's point of view, the newly loaded image just popped up on the monitor screen as opposed to being painted line by line on the screen.

Figure 2A:
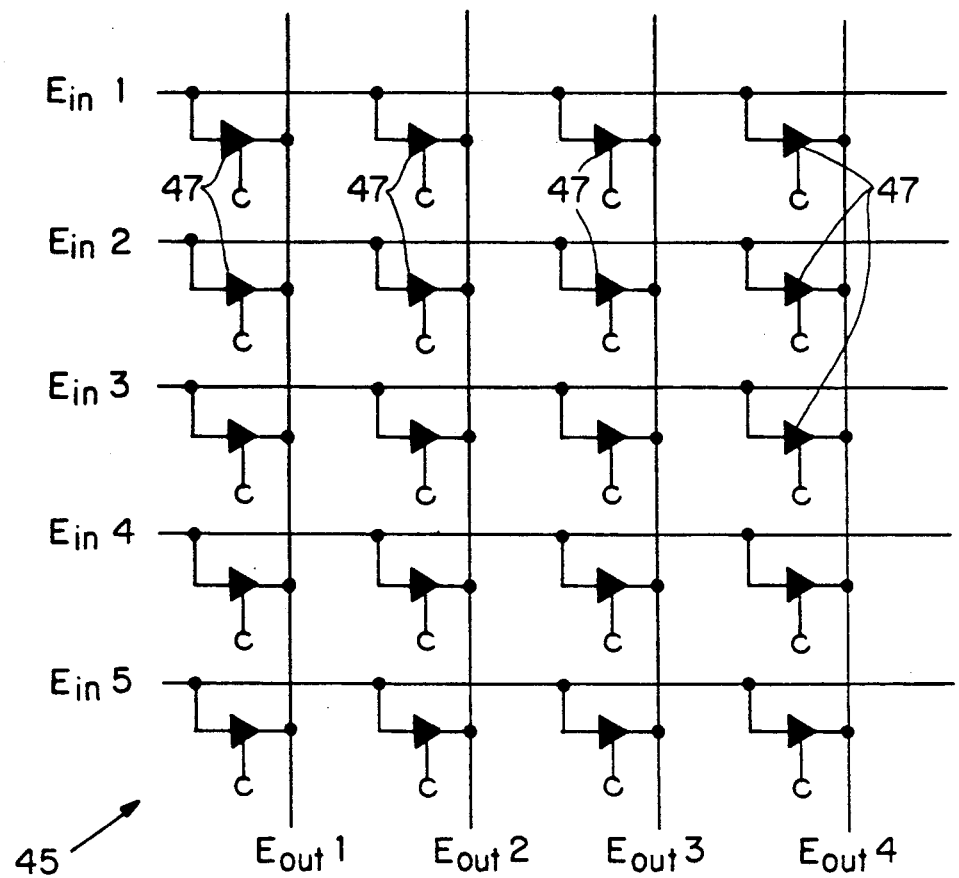
FIG. 2a is a schematic view of a crossbar switch employed in the workstation of FIG. 1b.
Figure 2B:
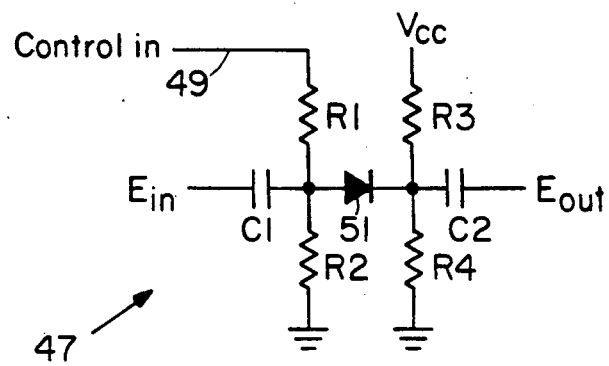

Also, it is understood that color images having red, green and blue components provide 3 inputs per input line shown in FIG. 2a. Hence, a crossbar switch for handling RGB image data may be used in the case of color images.

Referring back to FIG. 1b, a general purpose LAN (Local Area Network) interface 33 and the image graphic processor 43 provide the decision making and driving forces of the image/graphics display and processing system within a workstation 15. The image graphic processor 43 coordinates all data transfers between the various components within a workstation 15, performs all local image processing, and performs all graphic generation, and coordinates interaction with the user. In particular, the image graphic processor 43 performs user desired local image processing on requested images held in the cache/working buffer 35 and transfers the processed images to image display controllers 25 which subsequently drive monitors 23 with the processed images.

Further, the image-graphic processor 43 in tandem with the cache working buffer 35 enables the cache working buffer 35 to subsample an image if the partition of a monitor screen (the desired destination) is smaller than the image. In that situation, the image-graphic processor 43 also specifies to the receiving image display controller 25 the first column on the monitor screen to start laying in the image, the number of pixels to copy before proceeding to the next row in the bit map for the screen partition and other pertinent data moving information. Each image display controller 25 in turn employs an image rectangle loader 38 for receiving and interpreting the specified information from cache working buffer 35. The image rectangle loader 38 generates the proper digital pixel image and provides this map to the associated DAC (Digital Analog Converter) which subsequently drives the target monitor partician with the desired image.

Preferably the image graphic processor 43 comprises either a processor of the TI34010 type manufactured by Texas Instruments, Inc. including its attendant program and scratch memory or an MC68030 by Motorola and its attendant program and scratch memory. Other image graphic processors which similarly provide such processing and moving of image data are suitable.

The general purpose LAN interface 33 carries to the image archive/processor 17, via the general purpose LAN 21, information about the workstation 15, such as, image display and processing commands, and general system coordination commands. Since all command and control information travels over the general purpose LAN 21, the optical LAN 31 is left available to carry image data alone. That is, the optical LAN 31 is able to transfer image data free of control data and therefore achieve an image transfer efficiency rate of about 95%. A useable image data transfer rate of about 13 megabytes per second is also achieved unlike image transfer rates of existing display systems.

Preferably, the general purpose LAN interface 33 is an Ethernet link.

The serial connection of the Optical LAN 31, Image LAN controller 37 and cache/working buffer 35 through a dedicated image processing bus 39 provides for a cost efficient system. The cost of implementing a fully functional Optical LAN controller (i.e. one which is responsible for both image buffer memory and the handling of data control signals) is about ten times more expensive than using the image LAN controller 37 for buffer memory and the separate general purpose control bus 20 for control purposes. In addition, the image LAN controller 37 directly providing image data to the cache/working buffer 35 from the Optical LAN 31 through image processing bus 39, requires no permanently designed packet size for the transfer of data. Thus the packet size can be adjusted dynamically to be most efficient for each type of image data transferred. Furthermore, there are no intermediary data packet handling modules from which the image data must be copied before the image data is copied into the cache/working buffer 35. Hence the present invention omits unnecessary copying of image data found in other display systems between the Optical LAN 31 and cache/working buffer 35.

Time and economy advantages in image retrieval and display of images within a workstation 15 are also gained by using the separate buses (i.e. the high speed image and general purpose control buses 19, 20) for image data and control data as opposed to one bus within the workstation as is commonly done. This point is most easily understood by way of the following examples of operation of the image/graphics display and processing system of FIG. 1b.

When a user of a workstation 15 requests a number of images to be loaded into the workstation, the image-graphic processor 43 forwards the request to the image archive/processor 17 over the general purpose LAN 21. In response, the image archive/processor 17 provides the image graphic processor 43 pertinent specifications of the images and an indication of whether the images will be shortly transmitted on the optical LAN 31. The image graphic processor 43 through the general purpose control bus 20 allocates room in the cache/working buffer 35 for the requested images. Currently held image data within the cache/working buffer 35 is deleted as space is required. The image graphic processor 43 through the general purpose control bus 20 initializes the image LAN controller 37 to receive and possibly decompress the requested images. The image-graphic processor 43 of each workstation 15 and the image archive/processor 17 communicate with each other to provide the requested images to the proper workstation 15 and to satisfy any other requests from other workstations 15.

The images are packetized and sent one at a time from the image archive/processor 17 to the image LAN controller 37 on the optical LAN 31. During the transfer of requested images, the image-graphic processor 43 monitors the status of the image LAN controller 37 and cache/working buffer 35 to assure that the image transmission was error free. If not, the image-graphic processor 43 requests the image archive/processor 17 to retransmit the needed image data.

Subsequent to the retrieval of the requested images, a user request to display on a particular monitor 23 one of the retrieved images is satisfied in the following manner. The image graphic processor 43 causes (i) the desired image to be found in the cache/working buffer 35, (ii) the image data representing the image to be translated by the lookup table 41 and possibly modified by subsample subsystem 42, and (iii) the translated/modified image data to be placed on the high speed image bus 19. The image data is transferred through the high speed image bus 19 to the image display controller 25 which is currently available as detected by the image-graphic processor 43 over the general purpose control bus 20. As explained in detail above, one of the several image display controllers 25 is always available. Through the general purpose control bus 20, the image graphic processor 43 enables the available image display controller 25 and the crossbar switch 45 to drive the particular monitor 23 with the desired image data.

It is noted that all control data was carried on the general purpose control bus 20, and as a result the high speed image bus 19 was enabled to carry image data alone. Further, the highest rate of data transfer from the cache/working buffer 35 to the image display controller 25 is achieved by the available image display controller 25 having its complete memory bandwidth available because it is not currently driving a display monitor 23.

When a user requests a grey scale transformation of a displayed image on a monitor 23 the following occurs. Over the general purpose bus 20, the image-graphic processor 43 checks the cache working buffer 35 for the stored copy of the one displayed image. If a copy of the one image is not found, the image graphic processor 43 requests over the general purpose LAN 21 the image from the image archive/processor 17. Once the copy of the image is found in the cache/working buffer 35, the image graphic processor 43 locates over the general purpose bus 20 the available image display controller 25. Next, through the general purpose control bus 20, the image graphic processor 43 generates a new lookup table 41 in the cache working buffer 35 according to the desired requested grey scale transformation. The image graphic processor 43 transfers the copy of the image stored in the cache/working buffer 35 from the buffer, through the new lookup table 41 and optionally subsystem 42, across the high speed bus 19 and into the available image display controller 25. Through the crossbar switch 45, the image graphic processor 43 enables the newly loaded available image display controller 25 to drive the same monitor 23 on which the image was formerly being displayed but with a grey scale transformation as requested.

If the image which is desired to be processed is currently displayed on only one partition of a monitor 23 (as opposed to a full screen display) and other images which are not to be changed are displayed in the remaining partition of the monitor 23, then the other images must be preserved in the image display controller switching process described above. This is accomplished in the following manner. After the image graphic processor 43 has located the available image display controller 25, the image graphic processor copies the full contents of the image display controller 25, which is currently enabling display of the one desired-for-processing image and the other images, into the available image display controller 25. This copy is accomplished at full memory bandwidth across the high speed image bus 19 and is performed as the data is addressed for display without taking the currently used image display controller 25 off line. The copy time is at most the amount of time to display two or three image frames. This type of data transfer over the high speed image bus 19 from one image display controller 25 to another is called "snapping". The image graphic processor 43 then proceeds to generate the new look-up table 41 and subsequently transfers the copy of the to-be-processed image from buffer 35, through new look-up table 41, optionally through subsampler system 42, across high speed bus 19 and into the proper partition (i.e. the position of the subject image) of the available image display controller 25. Switching of crossbar switch 45 to drive the monitor 23 with the newly loaded image display controller 25 is then as previously described.

In a request to edge enhance an image, the image graphic processor 43 performs the calculations required and properly modifies the desired image. Through the general purpose control bus 20, the image graphic processor 43 allocates sufficient space in the cache working buffer 35 to temporarily hold the edge enhanced image. Throughout the edge enhancement process, the image graphic processor 43 uses the image processing bus 39 to transfer image data processed by the processor 43 to and from the cache/working buffer 35. In order to display the edge enhanced image, the image graphic processor 43 locates the available image display controller 25 over the general purpose control bus 20 and copies the edge enhanced image to the available image display controller 25 over the high speed image bus 19. The newly loaded available image display controller 25 is then connected to a user selected monitor 23 via crossbar switch 45 to drive that monitor with the edge enhanced image.

If the edge enhanced image is desired to be displayed on a monitor 23 along with images which are currently being displayed on that monitor 23, then the contents of the image display controller 25 currently connected to the monitor 23 must be snapped into the available image display controller 25 before the edge enhanced image is copied into the desired portion of the image display controller 25 as described above.

A user request to make a duplicate of a displayed image from one monitor 23 or partition thereof to another monitor 23 or partition thereof is handled by the image graphic processor 43 as a general load. A copy of the desired image is obtained from the cache/working buffer 35 and transferred on the high speed image bus 19 to the available image display controller 25. Snapping the contents of the image display controller 25 supporting the other monitor 23 into the available image display controller 25 is done as necessary. The newly loaded available image display controller 25 is then connected to the other monitor 23 to display a duplicate of the desired image in the desired manner (i.e. on a full screen or partition thereof).

To further minimize transfer time of image data, the image data is passed from the image archive 17 to a workstation 15 in a compressed form. Generally, images are compressed subsequent to entry into the image archive/processor 17 for storage. Data compression in this context is only effective if the decompression time is negligible in relation to the time saved to transmit the data. Furthermore, in many applications it is desirable to be able to decompress the image data in real time, specifically, to decompress the image data simultaneously with the receipt of the data. This implies that the decompression time per unit of data be less than or equal to the transfer time of the unit of data divided by the compression ratio (defined later). For high speed optical LANs (Local Area Networks) whose unit of data transfer rates approach the maximum hardware speed used to implement them, a further implication directs that the decompression scheme require only a few primitive mathematical operations (i.e. addition, shifting, etc.) per image pixel.

The foregoing requirements of a time efficient decompression scheme forbid use of the traditional schemes such as Huffman coding, Linear-predictor coding, etc. since they require many complex operations (multiplication and variable code word size lookup) to be performed for each decompressed pixel. Two classes of compression schemes that satisfy the foregoing requirements are Run Length Coding and Delta Coding schemes. Improved versions of these compression schemes plus a "Nested Adaptive Coding" compression scheme are employed in the present invention.

Generally, each pixel of an image is represented by either:

sixteen data bits, stored in four consecutive nibbles (4 bits) of a sixteen bit word;

twelve data bits, stored in three low order nibbles of a sixteen bit word with the high order nibble set equal to zero;

eight data bits, stored in two low order nibbles of a sixteen bit word with the two high order nibbles set equal to zero; or eight data bits, stored in an eight-bit byte.

Each of the foregoing representations of an image pixel is generally referred to as a "data word". The "data words" are stored in a file and are usually ordered in a row-by-row fashion such that the data word representing the upper left hand pixel of an image is at the beginning of the file, the next data word of the file represents the pixel to the right of the upper left hand pixel in the same row, and so on with the data word representing the pixel in the lower right hand corner of the image being last in the file. The compression manipulations of the present invention do not require a particular ordering of the data words in an image file corresponding to pixels of an image, either row-column or column-row ordering will yield essentially the same results.

In the preferred embodiment, four methods of compression are made available for compressing 8-bit (1 byte) long image data and three other compression methods are made available for compressing image data which are longer than 8 bits. The first two compression methods are based on Run Length Coding methods are applicable for image data in which the more significant bits of data words corresponding to a succession of pixels of an image change less often than the less significant bits of the data words, from one pixel to the next. Such image data is considered to have a high auto-correlation coefficient. The Run Length Coding methods are most advantageously applied to the high order bits of the data words of such image data. The second two compression methods are based upon Delta Coding techniques which are applicable to image data with a medium to low auto-correlation coefficient and local pixel value variance. The next two methods are based on simple nibble packing and are applicable for desired instances of quick minimal compression. The last method involves a technique of nested coding and is a fusion of the techniques for 8-bit data compression with Run Length Coding for the high order bits of image data.

Compression Method 1: Run Length Coding-Long

Figure 3:
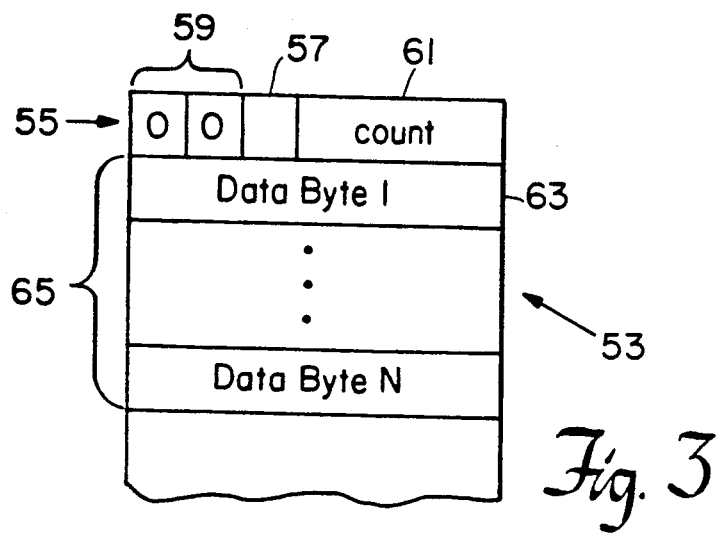
FIG. 3 is a schematic view of the data structure employed by the Run Length Coding—Long method of compression of image data in the display system of FIGS. 1a and 1b.

In encoding image data with Run Length Coding methods, data is determined to have one of two forms, a run of sames and a run of differents. In a run of sames, there is a series of similar valued pixels. The corresponding coding comprises the pixel value which is repeated and a count of the number of times the pixel value is repeated. In a run of differents, there is a series of different valued pixels. The corresponding coding comprises the count of different bytes and the list of the pixel values. Compression Method 1 is efficient for image data having long series or runs of similar pixel values (i.e. where the length of the run is greater than about 8). The method is most easily understood by the data structure it generates. Such a structure is referred to as a compression unit and is illustrated in FIG. 3. Other compression methods generate other compression units which are discussed later.

The first byte in compression unit 53 is a control byte 55 with three fields. The first field 59 comprises the two highest order bits of the control byte 55 and provides an indication of the type of compression method used to compress the image data within the compression unit. The two bits set to zero indicates the Run Length Coding-Long method. As will be described later, different compression methods are used within the same image and thus at decompression time the type of compression method used for the data within the compression unit can be readily determined from the first field of the control byte. The second field is the third highest order bit 57 and prodes an indication of the form (i.e. type of run) of the image data being coded. The form bit 57 is set to zero if a run of sames is being coded and is set to one if a run of differents is being coded. The third field, called the count field 61, comprises the remaining five bits of the control byte 55 and indicates the number of bytes of image data in the run indicated by the form bit 57. In the preferred embodiment, for a run of sames the value of the count field 61 is in the range of 2 to 33; for a run of differents the value of the count field 61 is in the range of 1 to 32. Also, biased unsigned integers are used for the values of the count field 61.

The following bytes 65 in the compression unit 53 are the bytes of image data. The values of these data bytes 65 are set to the pixel values which upon decompression are to be repeated in the manner indicated by the form bit 57. For a run of sames, the first data byte 63 will be the pixel value to be repeated the number of times indicated by the count field. For a run of differents, data bytes 1 through data byte n, where n equals the number indicated by the count field 61, hold the pixel values to be used upon decompression.

In order to determine how well a compression method compresses data, the compression ratio c is calculated and equals the ratio of the number of bytes of image data before compression to the number of bytes in the compression unit. For the Run Length Coding-Long method the compression ratio c for a run of sames equals $n/2$, where n is the length of the run (in bytes). For a run of differents, the compression ratio is $c=n/(n+1)$, always less than unity.

Examples of the compression of data and the resulting compression ratio using the Run Length Coding-Long method follow. An example of Run Length Coding-Long (Sames) is provided first and an example of Run Length Coding-Long (Diffs) is provided second.

Example 1. A run of 16 bytes, each having a value equal to 6.

The compression unit would have:
Control byte = [00, 0, 16]
Data byte 1 = [6]

The compression ratio is $16/2 = 8$. If the length of the run is greater than the maximum value that the count field 61 can represent, the data sequence would be encoded with a series of "sames" compression units.

Example 2. A sequence of bytes having the values 12, 33, 34, 45, 46, 45.

The compression unit would have:
Control byte = [00, 1, 6]
Data byte 1 = [12]
Data byte 2 = [33]
Data byte 3 = [34]
Data byte 4 = [45]
Data byte 5 = [46]
Data byte 6 = [45]

The compression ratio is $c = 6/(6+1) = 0.86$.

Compression Method 2: Run Length Coding—Short

For image data comprised of many short runs (less than 8 bytes per run), the following method is used in which two short runs are coded in one compression unit. The advantage of this method is that only half a byte is expended for control information per byte of image data whereas in previously described Method 1 a full byte is expended for control information for each data run.

Figure 4:
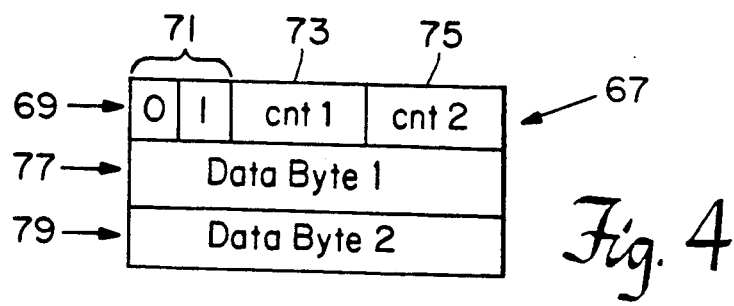
FIG. 4 is a schematic view of the data structure employed by the Run Length Coding—Short method of compression in the display system of FIGS. 1a and 1b.

The compression unit generated by Method 2 is illustrated in FIG. 4. The first byte, the control byte 69, of compression unit 67 has a first field 71 for indicating the compression method used and has two count fields 73, 75 for respectively indicating the number of bytes of two runs of sames encoded in the compression unit. The first field 71 comprises the two highest order bits of the control byte as in Method 1 but are set to 01 to indicate the Run Length Coding—Short method. The two count fields 73, 75 are each 3 bits long and hold values in the range of 1 to 8.

The byte 77 succeeding the control byte 69 is the data byte which corresponds to the first count field 73 and holds the pixel value to be repeated upon decompression the number of times indicated by the first count field 73. Similarly, the data byte 79 succeeding the first data byte 77 holds the pixel value to be repeated upon decompression the number of times indicated by the second count field 75.

For a data sequence which forms a double run of sames the compression ratio c equals $n/3$, where n is the number of bytes of data before compression.

An example of a compression unit generated by compression Method 2 for a sequence of nine bytes having the values 3, 3, 3, 3, 4, 4, 4, 4, 4 is as follows:
Control byte = [01, 4, 5]
Data byte 1 = [3]
Date byte 2 = [4]
Compression ratio $c = 9/3 = 3$ Compression Method 3: Delta—2

Generally, in a Delta compression scheme a sequence of pixel values is represented as a sequence of "delta values" which are computed by subtracting a previous pixel value from the succeeding pixel value for each pixel value in the sequence beginning with the second pixel value. For example, the original sequence of 112, 113, 110, 111 is delta compressed to the "difference sequence" of 1, −3, 1. More specifically, the compression unit generated by a typical Delta compression scheme comprises a starting pixel value, the number of pixel values to be generated from the compression unit upon decompression, and the sequence of delta values.

Further, just as in Run Length Coding compression methods there is a structurally imposed upper limit to the length of a run (the maximum value that the count field could represent), the same behavior manifests here. The number of bits allocated for coding each delta value implies a range of allowable delta values. For instance, 2-bit delta values allow differences from −1 to +2 to be expressed and 4 bits allow ranges from −7 to +8 to be expressed. Thus, long runs of image data which are expressible within a range of delta values may have to be encoded in multiple compression units.

Figure 5:
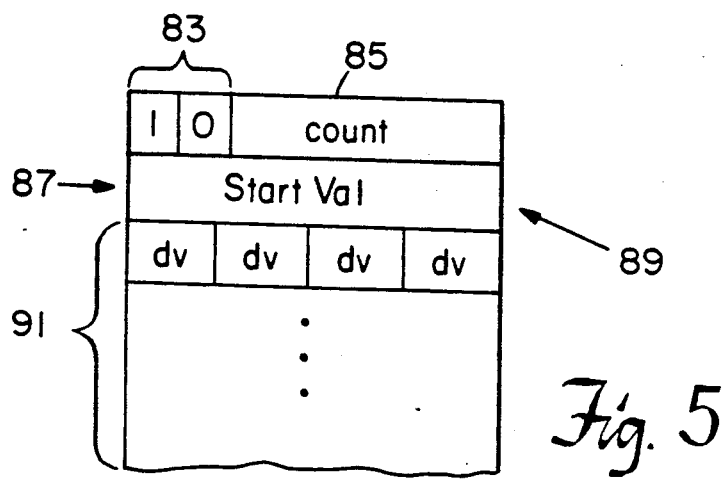
FIG. 5 is a schematic view of the data structure employed by the Delta-2 method of compression in the display system of FIGS. 1a and 1b.

The Delta-2 compression method generates a compression unit 89 illustrated in FIG. 5. The first byte, the control byte 81, has a two bit first field 83, which is similar to the first control byte field of the previously described compression methods, and a 6-bit count field 85. The first field 83 is set to 10 to indicate the Delta-2 compression method. The count field 85 is set to the number of delta values held in this compression unit 89. The byte which succeeds the control byte 81 holds the starting pixel value of the uncoded image data (i.e. sequence of pixel values). The remaining bytes 91 each hold four delta values in the range of $-1, 0, 1, 2$. For a sequence of pixel values expressible as a sequence of 2-bit delta values, the compression ratio c is $$c = n/(2 + Int[((n-1)/4) + 0.5])$$

where Int[] returns the greatest integer.

An example of the compression unit generated by compression Method 3 for the sequence of ten bytes having values 3, 3, 3, 3, 4, 3, 5, 6, 8, 9 is as follows:
  Control Byte = [10, 9]
  starting value byte = [3]
  Delta data 1 = [0, 0, 0, 1]
  Delta data 2 = [−1, 2, 1, 2]
  Delta data 3 = [1, x, x, x]
where x is an ignored value. The compression ratio $c = 10/(2+3) = 2$.

Compression Method 4: Delta-4

For some classes of image data, a range of delta values from $-1$ to $+2$ is insufficient to efficiently encode the data. Thus it may be advantageous to use four bits to encode the delta values in a range of $-7$ to $+8$. The advantage of such a compression scheme is that for noise data which is inappropriate for Run Length Coding or Delta-2 encoding, a compression ratio of about 2 can be achieved.

Figure 6:
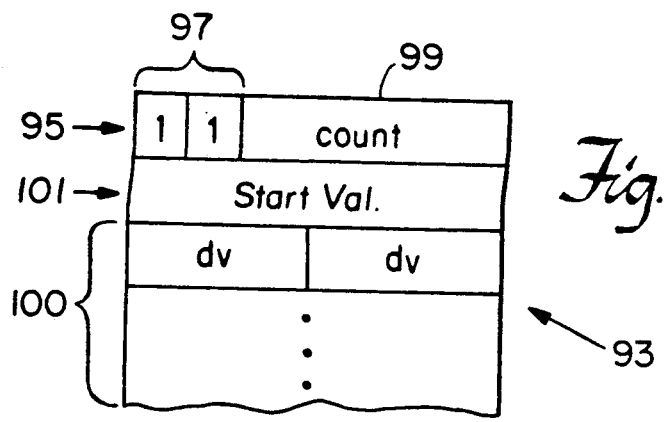
FIG. 6 is a schematic view of the data structure employed by the Delta-4 method of compression in the display system of FIGS. 1a and 1b.

A compression unit 93 for the Delta-4 compression method is illustrated in FIG. 6. Control byte 95, the first byte, comprises a first field 97 and a count field 99. The two highest order bits of control byte 95 form the first field 97 and are set to 11 to indicate the Delta-4 compression method. The remaining six bits of control byte 95 form the count field 99 and are set to the number of pixel values which are compressed into the compression unit 93.

The second byte 101 of the compression unit 93 holds the starting pixel value. The succeeding bytes 100 each hold up to two delta values in the range of $-7$ to $+8$, each delta value being represented in 4 bits. For a series of pixel values expressible as a sequence of 4-bit delta values, the compression ratio c is $$c = n/(2 + Int[((n-1)/2) + 0.5])$$

where Int [] returns the greatest integer.

Compression Method 5: Nibble 8/16

In the case where 8-bit pixel values are stored in a 16-bit word, the Nibble 8/16 compression method encodes only the meaningful part, that is the lower byte, of the word and discards the upper byte which is always zero. Although this compression method is simple and quick, it is not efficient. The compression ratio c equals $2n/(1+n)$, where n is the number of pixel values being compressed.

Figure 7:
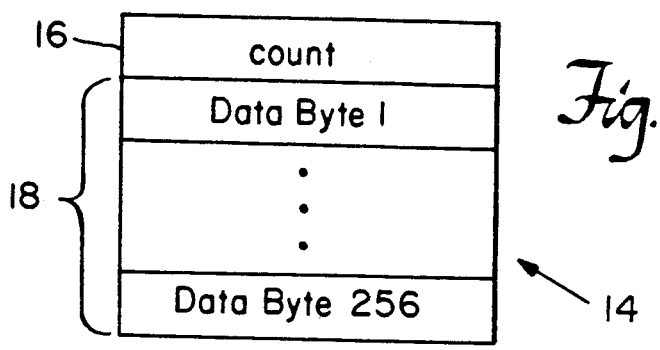
FIG. 7 is a schematic view of the data structure employed by the Nibble 8/16 method of compression in the display system of FIGS. 1a and 1b.

FIG. 7 provides an illustration of the compression unit 14 associated with the Nibble 8/16 compression method. The first byte 16 (i.e. control byte) of the compression unit 14 holds the number of pixel values compressed into the compression unit. The succeeding bytes 18 represent the low order bytes of the subject pixel values.

An example of a compression unit generated by the Nibble 8/16 method compressing the sequence of hex values of 0012, 0023, 0034, 0045, 0045, 0065 follows.
  Control byte = [6]
  Data byte 1 = [12]
  Data byte 2 = [23]
  Data byte 3 = [34]
  Data byte 4 = [45]
  Data byte 5 = [45]
  Data byte 6 = [65]
The compression ratio $c = 2 \times 6/(1+6) = 12/7 = 1.71$

Compression Method 6: Nibble 12/16

For the case of 12-bit pixel data stored in a 16-bit word, again a simple and quick compression method is to code only the three low order nibbles and not the upper nibble which is always zero. However, compressing in that manner implies that a pixel value will cross byte boundaries (i.e. will be represented by parts of two bytes). Also, although fast, the compression method is not efficient. The compression ratio C is equal to $2n/(1+1.5n)$, where n is the number of pixel values being compressed. The maximum compression is 1.33.

Figure 8:
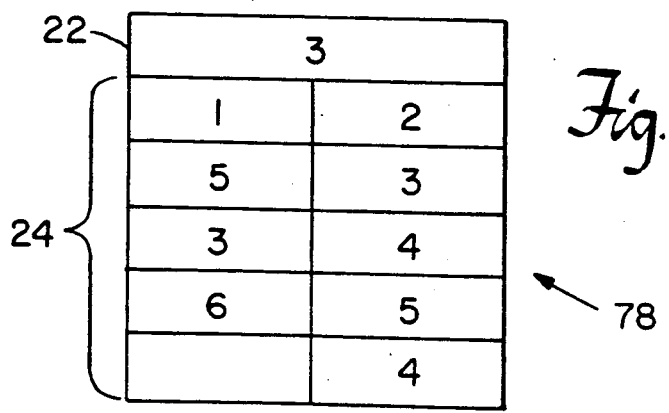
FIG. 8 is a schematic view of the data structure employed by the Nibble 12/16 method of compression in the display system of FIGS. 1a and 1b.

Provided in FIG. 8 is an illustration of the compression unit generated from the Nibble 12/16 compression of hex pixel values 0312, 0345, 0465. The control byte 22, the first byte, of compression unit 78 is set to the value 3, the number of pixel values compressed into the compression unit. The second and succeeding bytes 24 are data bytes each of which at most hold representations of two nibbles. Preferably, the low order portion of a data byte 24 is set to represent a nibble of a pixel value before the high order portion of the data byte 24 is set to represent the next meaningful nibble (i.e. non-zero nibble) in the sequence of pixel values. Hence, the lower order bits of the second byte in compression unit 78 is set to a value of 2, the value of the lowest order nibble in the first pixel value 0312, and the higher order bits of the second byte have a value of 1, the value of the second lowest order nibble in first pixel value 0312. The third byte in compression unit 78 holds in its lower order portion the value 3 which corresponds to the remaining non-zero nibble in first pixel value 0312. The higher order portion of the third byte holds a 5, the value of the next meaningful nibble in the given sequence of pixel values in order of lowest nibble to highest nibble per pixel value. The rest of the data bytes in compression unit 78 are likewise set.

The compression ratio $c = 2 \times 3/(1+4.5) = 6/5.5 = 1.09$.

Compression of Nibble 16/16

For the case of 16-bit pixel values stored in 16 bit words, compression is not efficient. In such a case, the pixel values are held in a compression unit with a control byte and a series of data bytes. The control byte is set to the number of 16-bit pixel values held by the compression unit for a sequence of pixel values. Each data byte holds a byte of a pixel value. Preferably, the first data byte holds the lower order byte of the first pixel value in a sequence of 16-bit pixel values, and the second data byte holds the high order byte of that first pixel value. The third data byte holds the lower order byte of the second pixel value, and so on.

Compression Method 7: Nested

As mentioned before in reference to the auto-correlation coefficient, the most significant bits of pixel values in an image will nearly always change very slowly relative to the change of the least significant bits of the pixel values. Hence, a Nested compression method advantageously uses the method of Run Length Coding to compress the high order byte of a 16 bit pixel value or the high order nibble of a 12 bit pixel value, and uses one of the first four described methods (Run Length Coding—Long, Run Length Coding—Short, Delta-2, Delta-4) to compress the low order byte of othe 16-bit or 12-bit pixel value. In particular, the Nested compression method is accomplished by the following steps:

(1) Scan the upcoming pixel values to determine the run length of constant (i.e. same) upper order bytes/nibbles (2) If the length of the run is greater than 3 then encode the constant upper order byte/nibbles, and apply to the low order bytes one of the four mentioned compression methods for 8-bit pixel values, else use the appropriate nibble packing compression methods (i.e. Methods 5 and 6).

Figure 9:
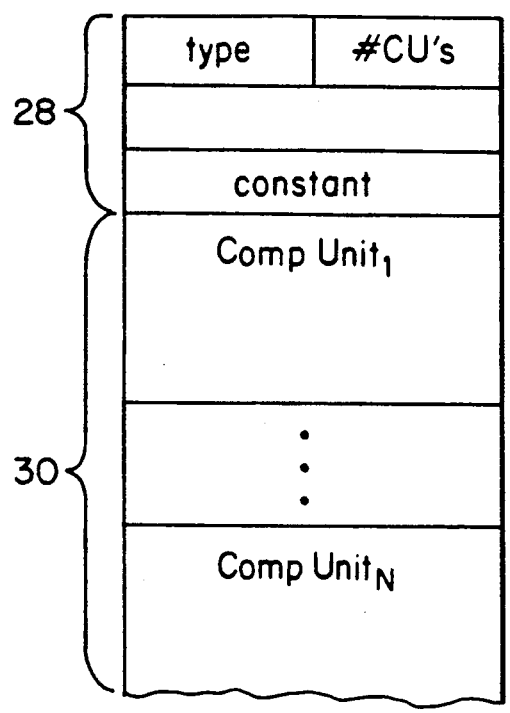
FIG. 9 is a schematic view of the data structure employed by the Nested method of compression in the display system of FIGS. 1a 1b.

An illustration of a compression unit 26 for implementing the Nested compression method is provided in FIG. 9. The first three bytes form a compression unit header 28. A "type field" of the header indicates the major type of compression being used. Preferably if the type field is set to 00, then the Nested code is indicated and the constant field (1 byte long) is set to the value of the high order byte/nibble which, upon decompression, is to be repeated the number of times indicated by the field labelled #CU's. The #CU's field also indicates the number of following compression units 30 that encode the corresponding low order bytes which have been compressed by one of the compression methods for 8-bit pixel values. If the type field of the header 28 is set to 01, then Nibble 8/16, 12/16 or 16/16 Coding is indicated, and the succeeding compression units 30 hold pixel data compressed by one of the foregoing nibble packing methods.

ADAPTIVE COMPRESSION METHODS

Applicant has found that nearly always the auto-correlation coefficient and the variance of the rolling average of pixel values changes for different areas of an image. Thus, to obtain higher compression efficiency the present invention uses different methods on different parts of the image. However, before the time of compression, it is unknown which methods will work best (i.e. will result in the highest compression ratio) in which regions of an image. Hence it is necessary to use adaptive techniques. One adaptive technique is to try each compression method on an upcoming sequence of image data and compare their compression ratios. However, the present invention employs an adaptive technique which checks compression methods in an order according to the length of a run of sames in the sequence of image data.

For 8-bit image data, the following table summarizes the order of the methods to try and the number of consecutive bytes with the same value at which no further checking is needed to determine that the method provides optimal compression relative to the other methods. In addition, the maximum compression ratio is listed.

| Method | # bytes to test | Max. Compression |
| --- | --- | --- |
| RLC-Long (Sames) | 13 | 16.50 |
| RLC-Short | 11 | 6.33 |
| Delta-2 | 8 | 3.47 |
| Delta-4 | 6 | 1.89 |
| RLC-Long (Diffs) | NA | 0.97 |

According to the table, if a run of sames of 13 bytes or more is found in the sequence of pixel values of interest, then the Run Length Coding—Long Method is the optimal compression method because no other method can yield a higher compression ratio. If the run of sames is 11 or 12 bytes long, however, then the Run Length Coding—Short method provides the optimal compression, and so on. In the case where no run of sames if found, then the pixel values are most efficiently stored sequentially by the Run Length Coding-Long (Diffs) Method. No other methods need to be checked, only the length of the run of sames and the table need to be checked. If decisive values can not be reached then the individual compression ratio for the methods are compared and the method having the best compression ratio chosen.

For 12-bit and 16-bit image data, a high order byte/nibble run of sames of sufficient length to justify Nesting coding must be determined. If such a run of sames is not found in the sequence of image data, then the 12-bit or 16-bit pixel values are compressed by one of the nibble packing compression methods described previously. If a run of sames which justifies compression by Nesting coding is found, then a determination of the optimal compression method for the lower order bytes is made. Preferably this determination is made by the table described above.

Figure 10:
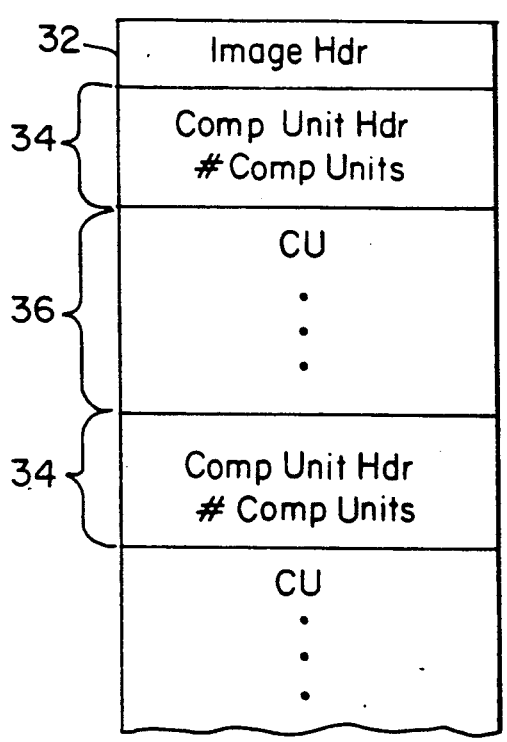
FIG. 10 is a schematic view of the data structure used to encode one image with the methods of compression of FIGS. 3-9 adaptively applied to high and low order bytes of data words of the image.

The data structure used to accomplish the foregoing adaptive compression is illustrated in FIG. 10. As a result of the determination of an optimal compression method for each series of image data in an image, a sequence of compression units 36 is formed. Each compression unit is one of the types described above, and series of compression units correspond to certain sequences of image data. Each series of compression units 36 is preceeded by a compression unit header 34 which indicates the number of compression units 36 before the next compression unit header 34. Other information concerning the associated series of compression units 36 may also be indicated in the compression unit header 34. An image header 32 is used as the first byte of the data structure and indicates that the following sequence of compression unit headers 34 and associated compression units 36 encodes all image data of a particular image. One field in the image header provides the total number of compression unit headers to be processed for the image. Another field in the image header provides an identification of the image which the data structure represents.

In sum, in the present invention, different compression methods are adaptively used for different bytes of image data. In particular, higher ordered bits/bytes are condensed by one of several compression algorithms and lower ordered bits/bytes are compressed by a different compression method depending on the information carried by the image data word. Other image data words may use even two more different compression methods for their higher and lower ordered bits/bytes respectively.

Some modes of image data transmission from the image archive/processor 17 to the image LAN controller 37 or a workstation 15 may require the data to be sent in fixed length packets. For example, to achieve maximum efficiency under the Ethernet LAN (Local Area Network), the packets should be 1,514 bytes long. When these packets are received, they are read into memory buffers of the image LAN controller 37. In the preferred embodiment, neither a compression unit header or a compression unit span packets and thus memory buffers of controller 37 to avoid spending more time than that which is available to switch input buffers. In the same light, the memory buffers of image LAN controller 37 may be paged or bank selected or of any other type of memory arrangement where more than one physical bank of memory occupies the same logical address and only one bank at a time is enabled for access. As the image data is being received it is decompressed and placed into the image LAN controller memory buffers. It is preferred that the image data generated upon decompression of each compression unit not span pages or banks because more time than that which is available to switch banks/pages may be required. Packet boundaries and memory buffer page/bank boundaries may be detected by conventional means and methods to achieve the foregoing.

SOFTWARE SUPPORT

The foregoing features of the display system of the present invention are implemented by the following image display software routines which form a main support program 80 (FIG. 11) executed in the image graphic processor 43. The image display software routines are designed to provide (i) "virtual image processing" and (ii) a program which is easy for applications programmers to use. In "virtually" processing images, the image display software processes images locally within a subject workstation 15 when possible and otherwise processes images through image archive/processor 17 with the assumption that all necessary image data is in image archive 17 (i.e. without transferring image data from workstation 15 to the image archive/processor 17). Such a processing scheme enables each user at a workstation 15 in the network of FIG. 1a to retrieve and process images from archive/processor 17 without affecting retrieval and processing performance at the other workstations 15 in the network, and thus in a transparent manner with respect to users of the other workstations 15.

For example, when a user requests an image transform, the support program 80 determines whether the transform is transformable through local processing or is so computationally intensive that the transform must be performed by the image archive/processor 17. In the latter case, the image graphic/processor 43 sends a request over the general purpose LAN 21 to the image archive/processor 17. The request identifies the function to be performed and the image on which the function is to be performed. Additionally, the request indicates the workstation to which the transformed image is to be sent. Upon receiving the request, the image archive/processor 17 performs the indicated function and sends an indication to the specified workstation to request the image when the workstation is ready. The image graphic/processor 43 of the workstation in turn requests the image archive/processor 17 to transmit the transformed image over the optical LAN 31 to the workstation 15. This allows the high performance image processing equipment of the image archive/processor 17 to be transparently shared between the many workstations 15. For this scheme to work effectively, the image archive/processor 17 preferably contains the image cache 44 which holds for quick access a number of the most recently accessed images.

To provide a program which is easy for applications programmers to use, the main support program 80 is designed such that it has few procedure calls for supporting the image handling and displaying of images in each workstation 15. To that end, the image display software is operated by changing data structures which represent the desired effect instead of by issuing explicit commands to the main support program. Specifically, the image display software manipulates data structures which represent how the images are to be displayed on the monitors 23 and then invokes a procedure "DO-TRAVERSE-SCREEN-PARTITION-DATABASE" 54 that causes all necessary local and image archive/processing steps to be carrier out.

The major data bases of the main support program 80 with their associated data structures as illustrated in FIGS. 12a-12d are a screen-layout-database 50, an image database 60, display database 66 and screen partition database 62. The screen-layout-database 50 comprises a number of possible layouts for a monitor screen. In particular it enumerates the locations of the rectangular regions that the screen has been partitioned into. Associated with each partition are a number of attributes, such as, GRID present (is a grid to be drawn onto the partition), SELECTABLE (is this partition selectable by the user using the mouse), TRANSFORMABLE (can images in this partition be transformed or otherwise manipulated), etc. Additionally, this structure contains the locations for graphic or textual objects that will be placed by default onto the display screen. For instance, the location where the name of the image is to be shown, the location where the orientation of the image (top, left, etc.) is to be shown, etc. There may be numerous screen-layout records each corresponding to a different layout of the screen. Each screen-layout record has a unique ID and a textual description.

The image database 60 catalogs each image within the workstation 15 by a unique identification number assigned to the image upon retrieval from the image archive/processor 17. The image database 60 holds a record for each image in the workstation 15, each record describing an image. In particular each record describes:

1) the physical-characteristic-of-the-image including the number of columns and rows in the image, the number of bits in each pixel, the type of pixel data (integer, floating), the number of data values that make up each pixel (1 number for REAL pixels, 2 numbers for IMAGINARY, etc.);

2) the default-display-attributes for the image, that is how the image is initially to be displayed in a partition. It lists attributes such as ZOOM (what magnification is to be applied to the image), ORIENTATION (what is the default gray scale transformation to be applied to the image), etc.

3) the image-owner's-demographics including what the image is, what it is about, and how was it acquired. For example, the image is a computed-tomogram of the brain, the image is the sixth in a series of twenty of the patient John Doe, and that John Doe is a 28 year old male with Social Security number 123-23-1234.

An index tree may be used to provide conversion between the image identification number and the system wide known image name.

The display database 66 comprises a number of records, one for each kind of different hardware display (i.e. monitor) known to the workstation. This database 66 describes the pixel resolution of the display monitor (number of rows and columns), the bit depth of the display monitor (1 bit, 8 bits, etc.), the capabilities of the display monitor (monochrome, color, hardware zoom functions, etc.), and pointers to the low-level support software for this display monitor. The low-level routines are a consistent set of routines for all displays that provide for very simple display functions such as initialize the display monitor, load a rectangular region of display memory with the specified data, etc.

The above three databases the Screen-layout 50, the Image 60 and the Display 66 are primarily read-only and are not usually modified by the image display software or the application programmer.

The screen-partition database 62 comprises a number or records, one for each partition on each screen of the monitors 23. By manipulating the contents of this database 62 the user, through the application programmer, causes the desired images to be manipulated and processed. Each record of this database 62 has the following parts:

1) an IMAGE-ID-NUMBER which uniquely identifies throughout the system the image in the screen partition corresponding to this record;

2) a CURRENT-DISPLAY-ATTRIBUTES which indicate how the image is currently to be displayed on the corresponding screen partition. This includes attributes such as ZOOM, ORIENTATION, GREY-SCALE-TRANSFORMATION, and CENTER (where the center of the image is in relation to the center of the partition). This part is formed of a number of fields each describing a particular display attribute.

3) a HIGH-LEVEL-TRANSFORM which describes the next high-level function to be performed upon this image, such as a filter transform, edge enhancement, image smooth, etc. In addition this part holds any of the necessary parameters necessary to further specify the transform, for example, filter coefficients.

4) COMMANDS-TO-EXECUTE that indicates which of the current-display-attributes fields have been modified.

5) OVERLAY-GRAPHICS which describes the graphic primitives currently on the image and that have been drawn upon the image by the user or by system utilities.

6) NON-COMMUTING TRANSFORMS which lists the non-commuting or order dependent transforms applied to the image. That is, for some image transforms the order in which they have been applied to an image is important. That is, for two non-commuting image transforms F and G applied to image 1, we have F(G(1)) does not equal G(F(1)). This part of data structure 62 represents a time ordered list of the non-commuting transforms applied to the image, their associated parameters, and the current display attributes.

Figure 11:
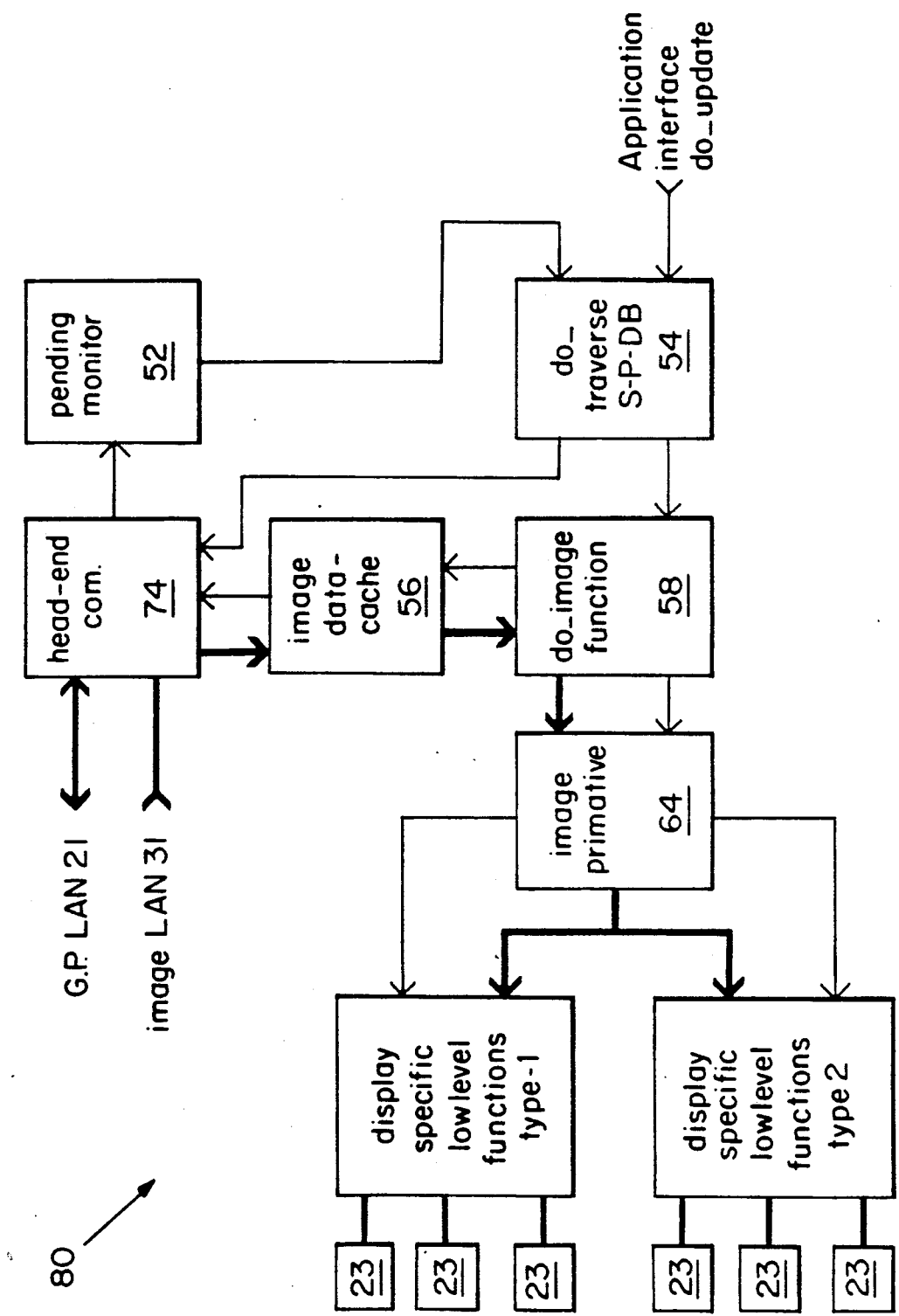

Thus, the screen partition database 62 provides a compressed and complete description of all images on all monitors in the workstation 15. Referring now to FIG. 11, the major program modules or image display software routines are described next. The module DO-TRAVERSE-S-P-DATABASE is responsible for traversing the screen-partition database 62 to search for any COMMANDS-TO-EXECUTE or HIGH-LEVEL-TRANSFORMS needing to be performed for a user request. For each image processing command found, the module 54 decides if the command can be done locally (i.e., within the work-station 15) or must be performed by the shared image archive/processor 17. For each command to be performed locally, the module 54 passes the request to the module DO-IMAGE-FUNCTION 58. For each command that is to performed by the shared image archive/processor 17, module DO-TRAVERSE-SCREEN-PARTICIAN-DATABASE 54 makes two requests through modules HEAD-END-COMMUNICATION 74 and IMAGE-DATA-CACHE 56. A first request involves application of the particular command to the specified image. The second request asks that the resultant image be transmitted to the work-station 15 and module PENDING-MONITOR 52 be informed that an image with a specified ID is expected, and furthermore, upon its arrival is to be placed at a specified screen and partition (via the command IMAGE-LOAD). Also the module DO-TRAVERSE-S-P-DATABASE 54 clears the request for the command from the COMMANDS-TO-EXECUTE or the HIGH-LEVEL-TRANSFORM field of the Screen Partician Database 62.

The module DO-IMAGE-FUNCTION 58 collects all the relevant data necessary to perform the function on the image at the designated screen and partition, as requested by the module DO-TRAVERSE-S-P-DATABASE 54. This includes gathering the location of the partition, the physical attributes of the image, and pointers to the image data in the local cache/working buffer 35. If all the data is in the workstation 15, specifically the image data is in the local cache/working buffer 35, this module 58 passes the request command along with the associated supporting image data to the module IMAGE-PRIMITIVE 64 for processing. Otherwise, its work is completed.

The module IMAGE PRIMITIVE 64 chooses the appropriate display-specific-low-level-driver, converts the relatively high-level requests received from DO-IMAGE-FUNCTION 58 to the low-level data abstractions needed by the functions of the display-specific low-level drivers, decides which low-level functions are needed to perform the requested function, and then invokes these functions in the display-specific low-level driver. Each display specific low-level-driver supports a collection of low level functions of various types that perform for each type of hardware display a uniform set of functions such as, initialize the display, clear the display, and load a block of pixel data into a rectangular section of display memory. There is one collection of low level functions for each type of hardware display connected to the workstation 15.

The module IMAGE DATA CACHE 56 manages a block of local high-speed storage that is used as a local cache for images. When pointers to image data are requested by module DO-IMAGE-FUNCTION 58 the IMAGE DATA CACHE module 56 either 1) if the image data is present, returns pointers to module DO-IMAGE-FUNCTION 58, or 2) if the image data is not present, passes a request to module HEAD-END-COMMUNICATIONS 74. In turn module 74 requests the image archive/processor 17 to (i) send the needed image data, and (ii) inform module PENDING-MONITOR 52 that an image with a specified ID is expected and that upon its arrival is to be placed at a specified screen and partition with the original desired function.

The module HEAD-END-COMMUNICATIONS 74 manages requests for image archive/processor 17 support. For incoming images, HEAD-END-COMMUNICATIONS module 74 requests module IMAGE-DATA-CACHE 56 to store images and then informs module PENDING-MONITOR 52 of the image arrival. Additionally, this module 74 passes requests to module PENDING-MONITOR 52 from module IMAGE-DATA-CACHE 56.

The module PENDING-MONITOR 52 logs multiple messages specifying that soon images will be received from the image archive/processor 17 that are intended to be placed upon specific screens and partitions. Upon receiving from module HEAD-END-COMMUNICATIONS 74 a message that an image with a particular ID has arrived, module PENDING-MONITOR 52 searches within an internal data structure for the message that indicates what screen and partition the image is to be displayed upon. Upon finding the associated message, module PENDING-MONITOR 52 inserts either the original command or the command to load the specified image upon the indicated screen and partition into the screen-partition database. The PENDING-MONITOR 52 then invokes module DO-TRAVERSE-S-P-DATABASE 54 to process the function/command as though the function was being invoked for the first time directly by a user request.

Interaction between the foregoing program modules for image processing most commands typically starts with the application programmer changing the image ID number, current display attributes, and/or high level transforms in the screen partician database 62 to effect the desired function. This in effect records any changes needed on the monitors 23 or in the user desired images. The commands-to-execute field is modified either explicitly by the application programmer or indirectly by the process of modifying the other three fields. After indicating all changes to the display screens 23 through changes to the screen-partition database 62 the applications programmer has only to invoke the module DO-TRAVERSE-SCREEN-PARTITION-DATABASE 54 to cause the display screens 23 to be updated to reflect the database 62. Thereafter one of three main control flow paths is taken through the main support program 80 of FIG. 11 depending on if the image data is present in the cache/working buffer 35 and if the request image processing command can be performed locally or must instead be performed by the image archive/processor 17.

In the first case where the function or command can be done locally and the image data is in the cache/working buffer 35, DO-TRAVERSE-S-P-DATABASE 54 passes the request to module Do-Image-Function 58 and clears the command from the screen partician database 62. DO-IMAGE-FUNCTION 58 requests and receives from the IMAGE-DATA-CACHE 56 pointers to the image data in the cache/working buffer 35. After collecting the pointer to the image data and all necessary information (such as coordinates of the destination screen and partition, description of the image x-y pixels, bit depth, etc.), the DO-IMAGE-FUNCTION module 58 passes the collected information and an indication of the destination partition to image primitive module 64. In turn IMAGE-PRIMITIVES-64 determines which DISPLAY-SPECIFIC-LOW-LEVEL-FUNCTIONS are needed to perform the requested functions and which driver to invoke. IMAGE-PRIMITIVE 64 thereafter invokes the necessary routines in the appropriate driver. The chosen low-level functions move, and if necessary transform, the pixel data to the display buffers to modify the monitors as desired.

In a second case, DO-TRAVERSE-S-P-DATABASE 54 determines that the command can be serviced locally and passes the request to DO-IMAGE-FUNCTION 58 which requests the image data from the image cache/working buffer 35 via IMAGE-DATA-CACHE 56. Finding the image data is not in the cache 35, DO-IMAGE-FUNCTION comes to completion. IMAGE-DATA-CACHE 56 passes a message to HEAD-END-COMMUNICATION MODULE 74 to request the image archive/processor 17 to send the desired image to the workstation 15. Module 74 transfers the request to image archive/processor 17 and informs the pending monitor 52 that image data is expected from the image archive/processor 17 and is intended to be loaded into a specified screen and partition with the original commands.

After some unspecified time module HEAD-END-COMMUNICATION 74 receives the image and thereafter 1) requests module IMAGE-DATA-CACHE 56 to place the received image into the image cache/working buffer 35 and 2) informs the module PENDING-MONITOR 52 that an image with a specified ID has arrived into the cache 35. Module PENDING-MONITOR 52 looks up the image ID in its internal data structure to determine which screen and partition the image is to be placed upon. Module PENDING-MONITOR 52 then modifies the appropriate screen-partition database record and indicates which command is to be performed. The PENDING-MONITOR 52 then invokes the module DO-TRAVERSE-S-P-DATABASE 54. The remaining processing is as in the first case since now there is a command that can be serviced locally and the image data is now in the local image cache 35.

In the case where the function cannot be processed locally, as determined by the module DO-TRAVERSE-S-P-DATABASE the following occurs.

By definition the image data cannot be in the local cache 35 at this time and the original image is at the image archive/processor 17. Module DO-TRAVERSE-S-P-DATABASE passes the request on to module HEAD-END-COMMUNICATION 74 requesting that the image archive-processor 17 perform the desired function on the specified image and then send the transformed image to the workstation 15.

Module HEAD-END-COMMUNICATION 74 sends the request to the image archive/processor 17 and informs module PENDING-MONITOR 52 that soon an image will be received and that image is intended to be loaded upon a specified screen and partition.

After some unspecified time module HEAD-END-COMMUNICATION 74 receives the transformed image and 1) requests module IMAGE-DATA-CACHE 56 to place the transformed image into the local image cache 35 and 2) informs module PENDING-MONITOR 52 than an image with a specified ID has arrived into the local cache 35. Module PENDING-MONITOR 52 looks up the image ID in its internal data structure to determine which screen and partition the image is to be placed upon. The module PEND- ING-MONITOR 52 next modifies the appropriate screen-partition database record and indicates that the command is an IMAGE-LOAD. The PENDING-MONITOR 52 then invokes the module DO-TRAVERSE-S-P-DATABASE 54. The remaining processing is as in the first case since now there is a command that can be serviced locally (IMAGE-LOAD) and the image data is now in the local image cache 35.

While the invention has been particularly shown and described with reference to a preferred embodiment thereof, it will be understood by those skilled in the art that various changes in form and details may be made therein without departing from the spirit and scope of the invention as defined by the appended claims. For example, in a particular application of the image/graphics system of FIGS. 1a-1b radiological image data such as x-rays and magnetic resonance images are stored in an image archive 17 and are transferred to workstations 15 on the one-way optical bus 31 upon user request. Graphics data, such as text and geometric markings (lines, boxes, etc.) provided and overlaid on a displayed image by a doctor during diagnosis, are passed to the workstations 15 via the general purpose bus 21.

What is claimed is:

1. An image display system for displaying images stored in a remote source, comprising:
   a plurality of display means viewable by a user;
   a plurality of display controllers, for each display means one display controller at a time being connectable to the display means to drive the display means, each display controller when connected to a display means providing the display means image data indicative of an image to be displayed, at any given time at least one display controller being unconnected to any display means while all display means are being driven by the other display controllers; and
   means for changing connections between display controllers and display means such that an unconnected display controller becomes connected to a display means and a display controller currently connected to the display means becomes disconnected, the display means thereby being driven in a paint-free fashion from image data from the currently connected display controller and then from image data from the unconnected display controller, such that the display means displays a succession of images with a substantially instantaneous whole image changeover between images.

2. An image display system as claimed in claim 1 wherein a number of display controllers in the plurality of display controllers is one more than a number of display means in the plurality of display means.

3. An image display system as claimed in claim 1 wherein the means for changing connections include a cross-bar switching circuit having a plurality of outputs connectable to the display means in a one to one correspondence and a plurality of inputs connectable to the display controllers in a one to one correspondence, each input associable with a different output; the circuit enabling throughput of image data from all but at least one input to their respectively associated outputs.

4. An image display system as claimed in claim 3 wherein the crossbar switching circuit includes means for enabling throughput of image data of a colored image.

5. An image display system as claimed in claim 3 further comprising:
   a plurality of video mixers one for each display means, each video mixer connected between a different display means and a respective output of the cross-bar switching circuit, such that image data indicative of the images from all but at least one of the display controllers are transferred to the video mixers; and
   means for providing to the video mixers graphic signals indicative of user generated data associated with the images provided by the display controllers; each video mixer combining respective image data and graphic signals of an image and driving the connected display means therewith to provide a display of the image overlayed with the user generated data.

6. An image display system as claimed in claim 5 wherein:
   the means for providing graphic signals to the video mixers includes a general purpose bus for receiving the user generated data; and
   the display controllers receive image data indicative of images to be displayed from a bus which is dedicated to carrying image data and which is independent of the general purpose bus.

7. An image display system as claimed in claim 5 wherein, for each image, the image data produce a black and white display of the image and the graphic signals produce a color display of the user generated data.

8. An image display system as claimed in claim 5 wherein, for each image, the image data produce a black and white display of the image and the graphic signals produce a black and white display of the user generated data.

9. An image display system as claimed in claim 1 further comprising an image data bus providing a relatively high bandwidth flow of image data to a display controller for driving a user specified partition of a display means.

10. An image display system as claimed in claim 1 further comprising an image data bus for passing image data to the unconnected display controller such that when the display controller becomes connected it drives a display means in a manner that displays an image on a user specified partition of the display means.

11. An image display system as claimed in claim 1 further comprising an image data bus for passing image data between the display controllers, the bus enabling copying of image data of an image from a display controller which is connected to a display means to a display controller which is unconnected to any display means while the connected display controller continues driving the display means.

12. An image display system as claimed in claim 11 further comprising:
   a cache memory for locally holding image data indicative of images to be displayed, the cache memory receiving image data from the remote source;
   the image data bus enabling transferring of image data from the cache memory to a display controller which is unconnected to any display means.

13. An image display system as claimed in claim 12 wherein the cache memory includes means for providing a grey scale transformation for each image to be transferred from the cache memory, the type of grey scale transformation being changeable for each transfer of image data from the cache memory on the image data bus.

14. An image display system as claimed in claim 12 wherein the cache memory includes means for modifying size of an image to be displayed, the size of an image being changeable for each transfer of image data from the cache memory on the image data bus.

15. An image display system as claimed in claim 1 wherein each display controller includes rectangle loader means for displaying an image at least on a first user specified portion of a first display means.

16. An image display system as claimed in claim 15 wherein the display controllers together with the means for changing connections enable the image displayed on the first portion of the first display means to be subsequently displayed on a second user specified portion of a second display means, spacial characteristics of the user specified portion of the second display means being independent of that of the portion of the first display means.

17. An image display system as claimed in claim 1 further comprising two communication channels, one channel for primarily transferring image data to the system from the remote source and the other channel connected to computer means for carrying control signals necessary to enable the transferring of image data on the one channel.

18. An image display system as claimed in claim 17 wherein:
the one channel is dedicated to transferring image data to the system, the one channel being unidirectional, and relatively high in bandwidth; and
the other channel is capable of providing multiple services, the other channel being bidirectional.

19. An image display system as claimed in claim 17 further comprising receiving means for decompressing image data being transferred from the remote source to the system, the receiving means changeably using one decompression scheme on a part of the image data and another decompression scheme on a remaining part of the image data to decompress the image data.

20. An image display system as claimed in claim 1 wherein the display means include display monitors for displaying medical images.

21. In an image display system having a plurality of display means, a method for displaying images stored in a remote source, comprising the steps of:
transmitting image data to be plurality of display controllers, for each display means, one display controller at a time being connectable to the display means to drive the display means with the image data, each display controller when connected to a display means providing the display means image data indicative of an image to be displayed, at any given time at least one display controller being unconnected to any display means while all display means are being driven by the other display controllers; and
changing connections between display controllers and display means such that an unconnected display controller becomes connected to a display means and a display controller currently connected to the display means becomes disconnected, such that the display means is driven in a paint free fashion from image data from the currently connected display controller and then from image data from the unconnected display controller so that the display means displays a succession of images with substantially instantaneous, whole image changeover between images.

22. A method for displaying as claimed in claim 21 wherein the step of changing connections includes providing an analog crossbar switching circuit having a plurality of outputs connectable to the display means in a one-to-one correspondence and a plurality of inputs connectable to the display controllers in a one-to-one correspondence, each input associable with a different output in a manner which enables throughput of image data from all but at least one input to respectively associated outputs.

23. A method for displaying as claimed in claim 21 further comprising the steps of:
transmitting to the display controllers graphic signals indicative of user generated data associated with the images of the image data transmitted to the display controllers; and
combining respective image data and graphic signals of an image and driving the connected display means therewith to provide a display of the image overlaid with the user generated data.

24. A method for displaying as claimed in claim 21 wherein the step of transmitting image data to a plurality of display controllers includes transferring image data between display controllers and between a local memory and the display controllers while the connected display controllers continue driving the display means.

25. A method for displaying as claimed in claim 21 further comprising the step of:
in the unconnected display controller, preparing image data to be subsequently displayed.

26. A method for displaying as claimed in claim 25 wherein the step of preparing image data in the unconnected display controller includes transferring image data from a connected display controller to the unconnected display controller.

27. A method for displaying as claimed in claim 25 wherein the step of preparing image data in the unconnected display controller includes transferring image data from a local memory area to the unconnected display controller.

28. An image display system for displaying images stored in a remote source, comprising:
a plurality of display means viewable by a user;
a plurality of display controllers, one display controller connectable to one display means at a time to drive the display means, each display controller providing to a display means image data indicative of an image to be displayed, at least one display controller being unconnected to any display means while all display means are being driven by the other display controllers; and
means for changing connections between display controllers and display means such that an unconnected display controller becomes connected to a display means and a display controller currently connected to the display means becomes disconnected, the display means thereby being driven in a paint-free fashion from image data from the currently connected display controller and then from image data from the unconnected display controller, the means for changing connections including a crossbar switching circuit having a plurality of outputs connectable to the display means in a one-to-one correspondence and a plurality of inputs connectable to the display controllers in a one-toone correspondence, each input associable with a different output; the circuit enabling throughout of image data from all but at least one input to their respectively associated outputs.

29. An image display system as claimed in claim 28 wherein the crossbar switching circuit includes means for enabling throughput of image data of a colored image.

30. An image display system as claimed in claim 28 further comprising:
- a plurality of video mixers one for each display means, each video mixer connected between a different display means and a respective output of the cross-bar switching circuit, such that image data indicative of the images from all but at least one of the display controllers are transferred to the video mixers; and
- means for providing to the video mixers graphic signals indicative of user generated data associated with the images provided by the display controllers; each video mixer combining respective image data and graphic signals of an image and driving the connected display means therewith to provide a display of the image overlayed with the user generated data.

31. An image display system as claimed in claim 30 wherein:
- the means for providing graphic signals to the video mixers includes a general purpose bus for receiving the user generated data; and
- the display controllers receive image data indicative of images to be displayed from a bus which is dedicated to carrying image data and which is independent of the general purpose bus.

32. An image display system as claimed in claim 30 wherein, for each image, the image data produce a black and white display of the image and the graphic signals produce a color display of the user generated data.

33. An image display system as claimed in claim 30 wherein, for each image, the image data produce a black and white display of the image and the graphic signals produce a black and white display of the user generated data.

34. An image display system for displaying images stored in a remote source, comprising:
- a plurality of display means viewable by a user;
- a plurality of display controllers, one display controller connectable to one display means at a time to drive the display means, each display controller providing to a display means image data indicative of an image to be displayed, at least one display controller being unconnected to any display means while all display means are being driven by the other display controllers;
- means for changing connections between display controllers and display means such that an unconnected display controller becomes connected to a display means and a display controller currently connected to the display means becomes disconnected, the display means thereby being driven in a paint-free fashion from image data from the currently connected display controller and then from image data from the unconnected display controller; and
- an image data bus for passing image data to the unconnected display controller such that when the display controller becomes connected it drives a display means in a manner that displays an image on a user specified partition of the display means.

35. An image display system for displaying images stored in a remote source, comprising:
- a plurality of display means viewable by a user;
- a plurality of display controllers, one display controller connectable to one display means at a time to drive the display means, each display controller providing to a display means image data indicative of an image to be displayed, at least one display controller being unconnected to any display means while all display means are being driven by the other display controllers;
- means for changing connections between display controllers and display means such that an unconnected display controller becomes connected to a display means and a display controller currently connected to the display means becomes disconnected, the display means thereby being driven in a paint-free fashion from image data from the currently connected display controller and then from image data from the unconnected display controller; and
- an image data bus for passing image data between the display controllers, the bus enabling copying of image data of an image from a display controller which is connected to a display means to a display controller which is unconnected to any display means while the connected display controller continues driving the display means.

36. An image display system as claimed in claim 35 further comprising:
- a cache memory for locally holding image data indicative of images to be displayed, the cache memory receiving image data from the remote source;
- the image data bus enabling transferring of image data from the cache memory to a display controller which is unconnected to any display means.

37. An image display system as claimed in claim 36 wherein the cache memory includes means for providing a grey scale transformation for each image to be transferred from the cache memory, the type of grey scale transformation being changeable for each transfer of image data from the cache memory on the image data bus.

38. An image display system as claimed in claim 36 wherein the cache memory includes means for modifying size of an image to be displayed, the size of an image being changeable for each transfer of image data from the cache memory on the image data bus.

39. An image display system for displaying images stored in a remote source, comprising:
- a plurality of display means viewable by a user;
- a plurality of display controllers, one display controller connectable to one display means at a time to drive the display means, each display controller providing to a display means image data indicative of an image to be displayed, at least one display controller being unconnected to any display means while all display means are being driven by the other display controllers, and each display controller including rectangle loader means for displaying an image at least on a first user specified portion of a first display means; and
- means for changing connections between display controllers and display means such that an unconnected display controller becomes connected to a display means and a display controller currently connected to the display means becomes disconnected, the display means thereby being driven in a paint-free fashion from image data from the currently connected display controller and then from image data from the unconnected display controller; the display controllers together with the means for changing connections enabling the image displayed on the first portion of the first display means to be subsequently displayed on a second user specified portion of a second display means, spatial characteristics of the user specified portion of the second display means being independent of that of the portion of the first display means.

40. An image display system for displaying images stored in a remote source, comprising:

a plurality of display means viewable by a user;

a plurality of display controllers, one display controller connectable to one display means at a time to drive the display means, each display controller providing to a display means image data indicative of an image to be displayed, at least one display controller being unconnected to any display means while all display means are being driven by the other display controllers;

means for changing connections between display controllers and display means such that an unconnected display controller becomes connected to a display means and a display controller currently connected to the display means becomes disconnected, the display means thereby being driven in a paint-free fashion from image data from the currently connected display controller and then from image data from the unconnected display controller;

two communication channels, one channel for primarily transferring image data to the system from the remote source and the other channel connected to computer means for carrying control signals necessary to enable the transferring of image data of the one channel; and receiving means for decompressing image data being transferred from the remote source to the system, the receiving means changeably using one decompression scheme on a part of the image data and another decompression scheme on a remaining part of the image data to decompress the image data.

41. In an image display system having a plurality of display means, a method for displaying images stored in a remote source, comprising the steps of:

transmitting image data to a plurality of display controllers, one display controller connectable to one display means at a time to drive the display means with the image data, each display controller providing to a display means image data indicative of an image to be displayed, at least one display controller being unconnected to any display means while all display means are being driven by the other display controllers; and changing connections between display controllers and display means such that an unconnected display controller becomes connected to a display means and a display controller currently connected to the display means becomes disconnected, such that the display means is driven in a paint free fashion from image data from the currently connected display controller and then from image data from the unconnected display controller, said step of changing connections including providing an analog crossbar switching circuit having a plurality of outputs connectable to the display means in a one-to-one correspondence and a plurality of inputs connectable to the display controllers in a one-to-one correspondence, each input associable with a different output in a manner which enables throughput of image data from all but at least one input to respectively associated outputs.

42. In an image display system having a plurality of display means, a method for displaying images stored in a remote source, comprising the steps of:

transmitting image data to a plurality of display controllers, one display controller connectable to one display means at a time to drive the display means with the image data, each display controller providing to a display means image data indicative of an image to be displayed, at least one display controller being unconnected to any display means while all display means are being driven by the other display controllers;

changing connections between display controllers and display means such that an unconnected display controller becomes connected to a display means and a display controller currently connected to the display means becomes disconnected, such that the display means is driven in a paint free fashion from image data from the currently connected display controller and then from image data from the unconnected display controller; and in the unconnected display controller, preparing image data to be subsequently displayed.

43. A method for displaying as claimed in claim 42 wherein the step of preparing image data in the unconnected display controller includes transferring image data from a connected display controller to the unconnected display controller.

44. A method for displaying as claimed in claim 42 wherein the step of preparing image data in the unconnected display controller includes transferring image data from a local memory area to the unconnected display controller.

* * * * *

UNITED STATES PATENT AND TRADEMARK OFFICE
CERTIFICATE OF CORRECTION

PATENT NO. : 5,046,027

DATED : September 3, 1991

INVENTOR(S) : James L. Taaffe and Maria Kaldis

It is certified that error appears in the above-identified patent and that said Letters Patent is hereby corrected as shown below:

Column 29, line 2, delete "throughout" and insert ---throughput---.

Signed and Sealed this

Twelfth Day of January, 1993

*Attest:*

DOUGLAS B. COMER

*Attesting Officer*     Acting Commissioner of Patents and Trademarks